(12) United States Patent
Ashworth et al.

(10) Patent No.: US 11,742,931 B2
(45) Date of Patent: Aug. 29, 2023

(54) TIME DIVISION DUPLEX (TDD) NETWORK PROTECTION REPEATER

(71) Applicant: Wilson Electronics, LLC, St. George, UT (US)

(72) Inventors: Christopher Ken Ashworth, Toquerville, UT (US); Dale Robert Anderson, Colleyville, TX (US); Ilesh V. Patel, Euless, TX (US)

(73) Assignee: Wilson Electronics, LLC, St. George, UT (US)

( * ) Notice: Subject to any disclaimer, the term of this patent is extended or adjusted under 35 U.S.C. 154(b) by 228 days.

(21) Appl. No.: 17/361,167

(22) Filed: Jun. 28, 2021

(65) Prior Publication Data

US 2021/0409106 A1 Dec. 30, 2021

Related U.S. Application Data

(60) Provisional application No. 63/091,205, filed on Oct. 13, 2020, provisional application No. 63/044,978, filed on Jun. 26, 2020.

(51) Int. Cl.
*H04B 7/155* (2006.01)
*H04B 17/40* (2015.01)
(Continued)

(52) U.S. Cl.
CPC ....... *H04B 7/15535* (2013.01); *H04B 7/1555* (2013.01); *H04B 17/336* (2015.01);
(Continued)

(58) Field of Classification Search
CPC .......... H04B 7/15535; H04B 7/1555; H04B 17/336; H04B 17/40; H04B 17/318;
(Continued)

(56) References Cited

U.S. PATENT DOCUMENTS 4,776,032 A 10/1988 Odate et al.
5,303,395 A 4/1994 Dayani
(Continued)

FOREIGN PATENT DOCUMENTS

EP 1 441 472 7/2004
EP 1 441 472 A2 7/2004
(Continued)

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Lana N Le
(74) *Attorney, Agent, or Firm* — Thorpe North & Western LLP

(57) ABSTRACT

A technology is described for a time division duplex (TDD) repeater with network protection. The TDD repeater can comprise a first port, a second port, and one or more amplification paths coupled between the first port and the second port. The TDD repeater can comprise a signal detector configured to measure a received signal power for a downlink (DL) signal in a first set of one or more TDD DL subframes. The TDD repeater can be further configured to adjust an uplink (UL) noise power or gain of the one or more amplification paths based on the received signal power for the DL signal in the first set of the one or more TDD DL subframes.

7 Claims, 23 Drawing Sheets

(51) Int. Cl.
  *H04L 5/14* (2006.01)
  *H04W 52/16* (2009.01)
  *H04W 52/24* (2009.01)
  *H04B 17/336* (2015.01)

(52) U.S. Cl.
  CPC .............. *H04B 17/40* (2015.01); *H04L 5/14* (2013.01); *H04L 5/143* (2013.01); *H04W 52/16* (2013.01); *H04W 52/243* (2013.01)

(58) Field of Classification Search
  CPC ....... H04B 7/15557; H04L 5/14; H04L 5/143; H04L 5/1469; H04L 25/026; H04W 52/16; H04W 52/243; H04W 52/46; H04W 52/52; H03F 3/24; H03F 2200/451; H03F 3/211; H03F 3/189; H03F 1/0277; H03F 2200/417; H03F 3/20; H03F 3/217; H03F 3/602; H03F 2200/111; H03F 2200/411
  See application file for complete search history.

(56) References Cited

U.S. PATENT DOCUMENTS

| | | | |
|---|---|---|---|
| 5,737,687 | A | 4/1998 | Martin et al. |
| 5,777,530 | A | 7/1998 | Nakatuka |
| 5,815,795 | A | 9/1998 | Iwai |
| 5,835,848 | A | 11/1998 | Bi et al. |
| 6,005,884 | A | 12/1999 | Cook et al. |
| 6,356,555 | B1 | 3/2002 | Rakib et al. |
| 6,711,388 | B1 | 3/2004 | Neitiniemi |
| 6,889,033 | B2 | 5/2005 | Bongfeldt |
| 6,990,313 | B1 | 1/2006 | Yarkosky |
| 7,035,587 | B1 | 4/2006 | Yarkosky |
| 7,221,967 | B2 | 5/2007 | Van Buren et al. |
| 7,409,186 | B1 | 8/2008 | Van Buren et al. |
| 7,486,929 | B2 | 2/2009 | Van Buren et al. |
| 7,974,573 | B2 | 7/2011 | Dean |
| 8,583,033 | B2 | 11/2013 | Ashworth et al. |
| 8,583,034 | B2 | 11/2013 | Cook et al. |
| 8,639,180 | B2 | 1/2014 | Cook et al. |
| 8,953,503 | B2 | 2/2015 | Subasic et al. |
| 9,729,307 | B1 | 8/2017 | Patel et al. |
| 9,743,362 | B1* | 8/2017 | Tian .................... H04W 52/241 |
| 9,788,274 | B2* | 10/2017 | Cook .................... H04B 7/155 |
| 10,211,966 | B2 | 2/2019 | Cui et al. |
| 10,404,223 | B2* | 9/2019 | Fox .................... H04B 7/15535 |
| 10,523,160 | B2* | 12/2019 | Ashworth ............... H03F 3/195 |
| 2002/0044594 | A1 | 4/2002 | Bongfeldt |
| 2003/0039086 | A1 | 2/2003 | Kase et al. |
| 2003/0123401 | A1 | 7/2003 | Dean |
| 2004/0137854 | A1 | 7/2004 | Ge |
| 2004/0146013 | A1* | 7/2004 | Song .................... H04B 7/15507 370/279 |
| 2004/0166802 | A1 | 8/2004 | McKay, Sr. et al. |
| 2004/0219876 | A1 | 11/2004 | Baker et al. |
| 2004/0235417 | A1 | 11/2004 | Dean |
| 2005/0090245 | A1 | 4/2005 | Kim |
| 2005/0118949 | A1 | 6/2005 | Allen et al. |
| 2006/0084379 | A1 | 4/2006 | O'Neill |
| 2007/0071128 | A1 | 3/2007 | Meir et al. |
| 2007/0188235 | A1 | 8/2007 | Dean |
| 2008/0014862 | A1 | 1/2008 | Van Buren et al. |
| 2008/0081555 | A1 | 4/2008 | Kong et al. |
| 2008/0096483 | A1 | 4/2008 | Van Buren et al. |
| 2008/0278237 | A1 | 11/2008 | Blin |
| 2011/0151775 | A1 | 6/2011 | Kang et al. |
| 2012/0188919 | A1 | 7/2012 | Subasic et al. |
| 2013/0053020 | A1 | 2/2013 | Van Buren et al. |
| 2013/0114505 | A1 | 5/2013 | Haim et al. |
| 2013/0203403 | A1 | 8/2013 | Cook et al. |
| 2013/0203404 | A1 | 8/2013 | Cook et al. |
| 2014/0111154 | A1 | 4/2014 | Roy et al. |
| 2015/0029909 | A1 | 1/2015 | Ashworth et al. |
| 2018/0041234 | A1 | 2/2018 | Klopper et al. |
| 2018/0248676 | A1 | 8/2018 | Raggio et al. |
| 2018/0294868 | A1* | 10/2018 | Ashworth .......... H04B 7/15507 |
| 2018/0351633 | A1 | 12/2018 | Birkmeir et al. |
| 2019/0222258 | A1 | 7/2019 | Bohls et al. |
| 2019/0312630 | A1 | 10/2019 | Ashworth et al. |
| 2020/0028567 | A1 | 1/2020 | Ashworth |
| 2020/0112381 | A1* | 4/2020 | Barnes ................. H04B 17/327 |
| 2020/0145093 | A1 | 5/2020 | Cheng et al. |
| 2020/0177269 | A1 | 6/2020 | Nordgren et al. |
| 2020/0245261 | A1 | 7/2020 | Othman et al. |
| 2021/0037459 | A1 | 2/2021 | Li et al. |
| 2021/0083759 | A1 | 3/2021 | Hanson et al. |
| 2021/0242916 | A1 | 8/2021 | Lomayev et al. |

FOREIGN PATENT DOCUMENTS

| | | |
|---|---|---|
| EP | 1525678 B1 | 7/2008 |
| KR | 2020-0056821 A | 5/2020 |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50—8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet; 218 pages.

* cited by examiner

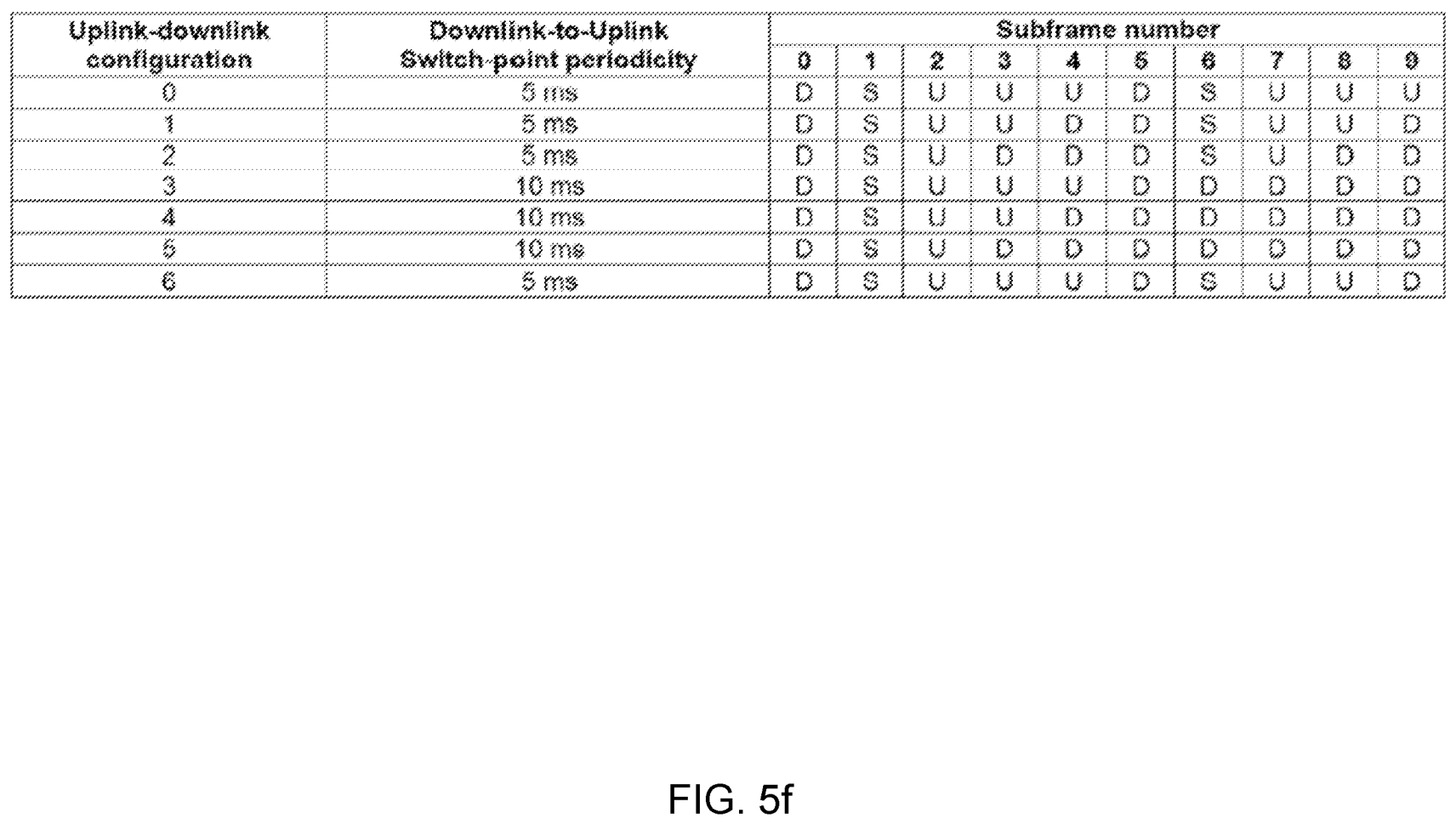

| Uplink-downlink configuration | Downlink-to-Uplink Switch-point periodicity | \multicolumn{10}{c}{Subframe number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5f

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |

FIG. 5g

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | F | F | F | F | U |
| 32 | D | F | U | U | U | U | U | U | U | U | U | U | U | U |
| 33 | D | D | F | U | U | U | U | U | U | U | U | U | U | U |
| 34 | D | F | F | U | U | U | U | U | U | U | U | U | U | U |
| 35 | D | D | D | F | U | U | U | U | U | U | U | U | U | U |
| 36 | D | D | F | F | U | U | U | U | U | U | U | U | U | U |
| 37 | D | F | F | F | U | U | U | U | U | U | U | U | U | U |
| 38 | D | D | D | D | F | U | U | U | U | U | U | U | U | U |
| 39 | D | D | D | F | F | U | U | U | U | U | U | U | U | U |
| 40 | D | D | F | F | F | U | U | U | U | U | U | U | U | U |
| 41 | D | F | F | F | F | U | U | U | U | U | U | U | U | U |
| 42 | D | D | D | D | D | F | U | U | U | U | U | U | U | U |
| 43 | D | D | D | D | F | F | U | U | U | U | U | U | U | U |
| 44 | D | D | D | F | F | F | U | U | U | U | U | U | U | U |
| 45 | D | D | F | F | F | F | U | U | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | F | F | U | D | D | F | F | F | F | U |
| 51 | D | F | F | F | F | F | U | D | F | F | F | F | F | U |
| 52 | D | F | F | F | F | F | F | D | F | F | F | F | F | F |
| 53 | D | D | F | F | F | F | F | D | D | F | F | F | F | F |
| 54 | F | F | F | F | F | F | F | F | F | F | F | F | F | F |
| 55 | D | D | D | D | D | D | F | D | D | D | D | D | D | D |

FIG. 5h

TIME DIVISION DUPLEX (TDD) NETWORK PROTECTION REPEATER

RELATED APPLICATIONS

The present application claims the benefit of U.S. Provisional Patent Application No. 63/091,205 filed Oct. 13, 2020 and U.S. Provisional Patent Application No. 63/044,978 filed Jun. 26, 2020, the entire specifications of which are hereby incorporated by reference in their entirety for all purposes.

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5f illustrates time division duplex (TDD) Long Term Evolution (LTE) uplink-downlink configurations in accordance with an example;

FIG. 5g illustrates time division duplex (TDD) 5G uplink-downlink configurations in accordance with an example;

FIG. 5h illustrates time division duplex (TDD) 5G uplink-downlink configurations in accordance with an example;

Figure 1:
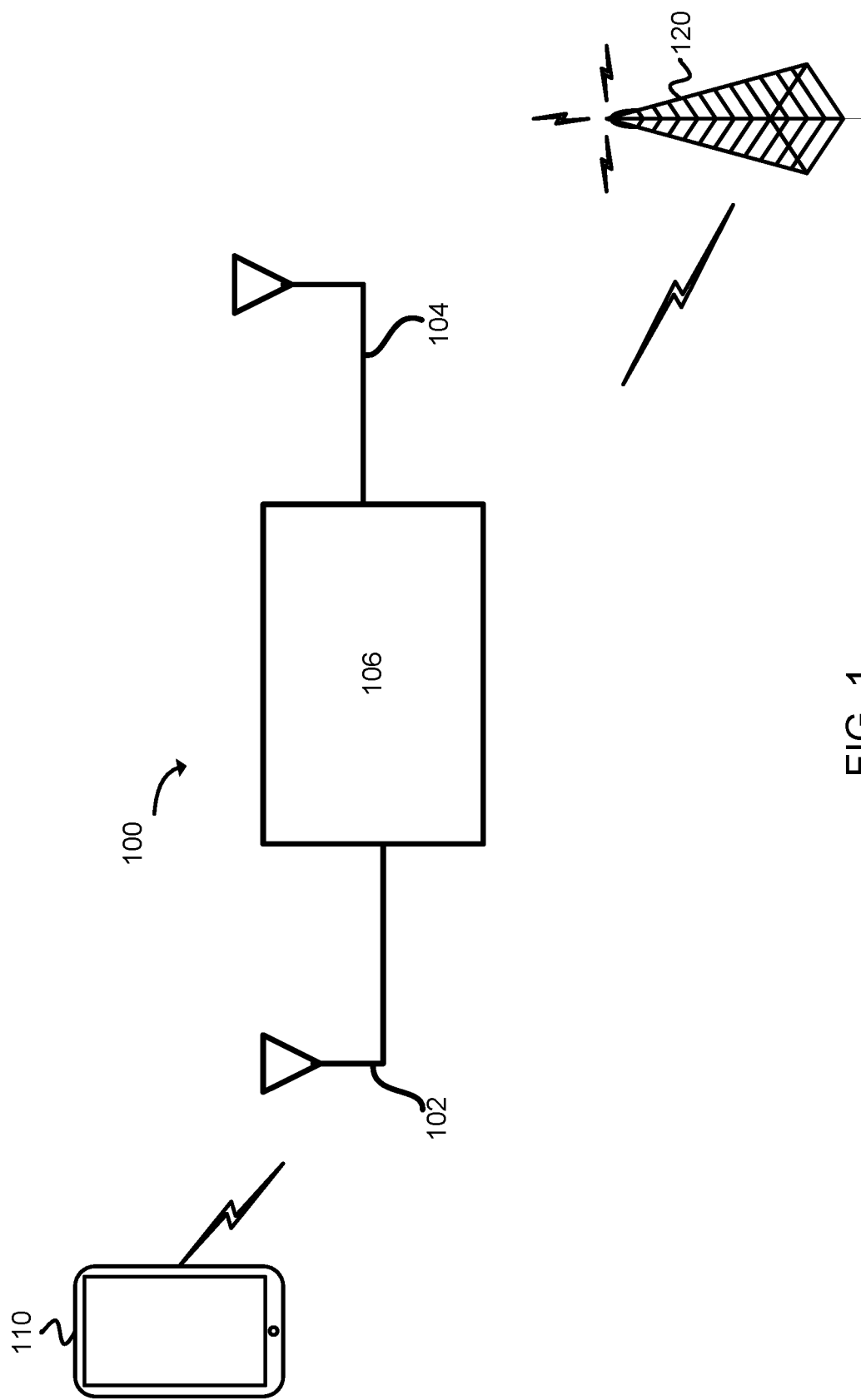
FIG. 1 illustrates a TDD repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Repeaters can increase the quality of wireless communication between a wireless device and a wireless communication access point by amplifying, filtering, or applying other processing techniques to uplink and downlink signals communicated between the wireless device and the wireless communication access point.

Governmental entities such as the Federal Communications Commission (FCC) set forth regulations pertaining to network protection (i.e. safeguards designed to minimize interference to wireless networks from repeaters). The network protection standards do not address time division duplex (TDD) frequency bands. Because many frequency bands (e.g., with a frequency greater than about 2.3 gigahertz (GHz)) are TDD frequency bands and operating a repeater in TDD frequency bands is difficult without network protection standards, network protection rules for TDD repeaters should be determined.

For frequency division duplex (FDD) repeaters, network protection can include estimating the base station coupling loss (BSCL) from the base station received signal strength indication (RSSI) at the repeater donor port. Network protection can be configured using this BSCL for many FDD repeaters.

However, this approach may not be operable for TDD repeaters. Some common network protection challenges for TDD repeaters can include: (a) downlink power varying over time, (b) downlink power varying based on type of transmitter (e.g., macro station, small cell, relay node, and the like), (c) extreme fading environments (e.g., millimeter wave (mm WAVE)), (d) multiple input multiple output (MIMO) effects, (e) beam formers that scan and quickly vary direction, and (f) downlink uplink decoupling (DUDe). The FCC rules allow for equivalent protections. For example, § 20.21 (e)(10) of Title 47 states: "Consumer Signal Boosters which do not meet the technical specifications enumerated in paragraphs (e)(1) through (e)(9) of this section may also meet the Network Protection Standard if they provide equivalent protections as determined by the Wireless Telecommunications Bureau." Therefore, TDD network protection rules that satisfy § 20.21 (e)(10) of Title 47 should be identified.

In one example, as illustrated in FIG. 1, a time division duplex (TDD) repeater 100 can include a first port 102 (e.g., a server port), a second port 104 (e.g., a donor port), and one or more amplification paths coupled between the first port and the second port 106. The TDD repeater 100 can be configured to receive a TDD signal from a UE 110 and send a TDD signal to a node 120. The TDD repeater can be configured to receive a TDD signal from the node 120 and send a TDD signal to the UE 110.

In one example, the TDD repeater can include a signal detector configured to measure a received signal power (e.g., an RSSI) for a downlink (DL) signal in a first set of one or more TDD DL subframes. The repeater can be configured to adjust an uplink (UL) system noise power or gain. The system noise power or gain can include adjusting the UL noise power or gain of the one or more amplification paths based on the received signal power for the DL signal in the first set of the one or more TDD DL subframes. The system noise power can include the noise power for a selected band and/or a selected direction that includes the noise power contribution from the antenna gain and coaxial cables in the system. In one embodiment, the DL signal can be a directional signal received using beamforming. The received signal power for the DL signal in the first set of the one or more TDD DL subframes in a selected direction can be measured using the signal detector. The UL gain or noise power can then be adjusted for an uplink signal to be transmitted by the TDD repeater in the selected direction based on the received signal power for the DL signal in the selected direction. In one example, the UL signal can be a same TDD signal as the DL signal. Alternatively, the UL signal can be a different TDD signals as the DL signal.

In one example, a power measurement method for a TDD repeater can include synchronizing a spectrum analyzer to a TDD frame configuration. The method can include measuring uplink (UL) or downlink (DL) transmitted power over a set of two or more non-contiguous sub-frames (e.g., between two UL subframes or between two DL subframes). The method can include calculating an average noise power measurement from the UL or DL transmitted power over the set of two or more non-contiguous sub-frames.

In one example, a TDD repeater can be configured to identify when a valid sync is generated; and operate in one or more of an uplink (UL) transmit power OFF mode or a downlink (DL) power OFF mode until the valid sync is generated.

In one example, a TDD repeater can be configured to: disable UL transmission when the TDD repeater is not transmitting in a UL subframe or prior to an end of a post-UL subframe guard period; and disable DL transmission when the TDD repeater is not transmitting in a TDD DL subframe or prior to the end of the post-DL subframe guard period.

In one example, a TDD repeater can be configured to measure a received signal power (e.g., an RSSI) for a frequency range of a downlink (DL) signal in a selected direction. The TDD repeater can be configured to determine the frequency range availability for the UL signal based on the received signal power for the DL signal in the selected direction. The TDD repeater can be configured to adjust an uplink (UL) gain for the selected direction based on the received signal power for the DL signal in the selected direction.

In one example, a TDD repeater can include a first port, a second port, one or more amplification paths coupled between the first port and the second port, and a signal detector. The signal detector can be configured to measure a power variance for a first-direction signal (e.g., UL signal) in a first set of one or more first-direction subframes (e.g., UL subframes). The repeater can be configured to determine that an oscillation may have occurred in the first-direction signal when the power variance is low, or determine that an oscillation has not occurred in the first-direction signal when the power variance is high.

In typical 3GPP 4G and 5G signals, the peak to average power ratio (PAPR) is fairly high, around 7 to 10 dB. When the power variance is substantially below this value, it can infer that the amplifiers are becoming saturated. For instance, in one example, a low power variance can be less than 3 dB of variance. When less than 3 dB of variance has occurred, then the repeater can be configured to determine that an oscillation may have occurred in the first-direction signal. Typically, when the variance is less than 1 dB it is due to the amplifiers in the repeater being near saturation, indicating that the repeater is near saturation due to oscillation feedback. When the variance is greater than 1 dB, or in the previous example, greater than 3 dB, then the power variance can be considered to be high, and the repeater can be configured to determine that an oscillation has not occurred in the first-direction signal. A threshold level for the variance can be set for the repeater based on the repeater design. When the power variance is less than the threshold level, such as 3 dB, 2 dB, or 1 dB, then the repeater can be configured to determine that an oscillation has occurred in the first direction signal at the repeater.

In one example, an oscillation may occur in a first direction signal on the one or more amplification paths coupled between the first port and the second port. The oscillation can cause the amplifiers in the one or more amplification paths to saturate. The gain in the one or more amplification paths can be reduced or disabled (i.e. turned off). If the gain is reduced or disabled after the RF detector, then the oscillation will typically go away (i.e. no oscillation will occur) and the RF detector can be used to determine that the oscillation is not occurring. This infers that there was an oscillation occurring at the previous level of gain. However, if a real signal (i.e. not a signal caused by an oscillation) is detected at the RF detector, the real signal will not go away even when the gain is reduced. The amplitude of the signal will merely decrease by approximately the same level as the reduction in gain or the disabling (turning off) of the gain.

In one example, the first direction signal can be an UL TDD signal. The repeater can be configured to measure a first signal level of UL TDD signal within an UL TDD subframe. A repeater may typically sample a power measurement for 5-20 milliseconds for power variance. However, a single 4G or 5G subframe can be as short as 1 millisecond. A 5G TDD slot within a subframe can be as short as 250 microseconds. The measurement of a change in amplitude between a first amplification level and a second amplification level can be performed within the slot time of a subframe, enabling an oscillation determination to be made within the relatively short period of a TDD subframe.

In another example, a first amplification factor can be applied to a first direction TDD signal received at a first port of a TDD repeater. A resultant amplified first direction TDD signal can be transmitted via a second port of the TDD repeater. A first signal level of the first direction TDD signal can be measured within a first selected subframe of the first direction TDD signal while a first amplification factor is applied to the first direction TDD signal. A second amplification factor can be applied to the first direction TDD signal, the second amplification factor being less than the first amplification factor. In one embodiment, the second amplification factor can be approximately zero to substantially turn off amplification. A second signal level of the first direction signal can be measured within a second selected subframe of the first direction TDD signal while the second amplification factor is applied to the first direction TDD signal. If the second signal level is significantly less than the first signal level, then it infers that an oscillation was occurring in the first direction TDD signal at the first amplification factor. Accordingly, the first amplification factor for the first direction TDD signal can be reduced by a predetermined amount in the event that the second signal level is significantly less than the first signal level.

The reduction in amplification factor can occur after the power detector, such as an RF detector in the signal chain. So there is no effective decrease in amplification of the actual real signal. In one example, the final amplification stage in the signal chain can be disabled. The power detector can be located right before that final stage amplifier, such as the power amplifier 558. The final stage power amplifier can have 30 dB of gain nominally. When the power amplifier is disabled (i.e. turned off), the power amplifier has −20 dB gain (i.e. 20 dB of loss), for a 50 dB amplification reduction. A real signal will still appear to the power detector the same as before (with nominal PAPR variance). An oscillation will be significantly reduced.

One reason that the amplification is reduced by a large amount, such as 50 dB, is that it is not known how far into saturation the booster may be. If the donor and server antennas are located right next to each other, then the 50 dB of amplification factor reduction may be needed just to get the amplifiers out of saturation.

More generally, a difference in amplification of greater than 10 dB in RF detected level after reducing the amplification factor is used to determine if there is an oscillation. A difference of greater than 10 dB indicates that there likely was an oscillation. A repeat of the reduced amplification factor measurement can be performed two or more times verify that the large change was not just an anomaly. An anomalous measurement can occur, for example, when one measurement occurs at a minimum in the PAPR.

The second signal level can be significantly less than the first signal level when the second signal level is less than the first signal level by a threshold amount greater than a difference between the first amplification factor and the second amplification factor. The method can be repeated until the second signal level is not less than the first signal level by the threshold amount greater than the difference between the first amplification factor and the second amplification factor. For example, the first amplification factor may be 6 dB. The second amplification factor may be 0 dB. The second signal level may be reduced by 9 dB when the second amplification factor is applied, or 3 dB more than the difference between the second amplification factor and the first amplification factor. A threshold level of 6 dB, 10 dB, 13 dB, or 20 dB may be used to determine if an oscillation has occurred, depending on the system design and setup of the TDD repeater. As noted, when the donor and repeater antennas are located quite close, a greater threshold may be used.

The amplification factor, in one embodiment, is a multiplier that is applied to the electrical signal. The amplification factor can result in either an amplified or attenuated output signal. When the amplification factor is less than one, the amplified signal will have lower amplitude than the original electrical signal. Conversely, when the amplification factor is greater than one, the amplified signal will have greater amplitude than the original electrical signal.

In one example, the first selected subframe can be the same subframe as the second selected subframe. In other words, the first measurement and the second measurement can be performed at the first amplification factor and the second amplification factor within the selected subframe. This can be advantageous, as the oscillation can be reduced or stopped by reducing the amplification factor for the first direction TDD signal before a next subframe. Alternatively, the first selected subframe can be different from the second selected subframe. In some embodiments, the time to switch the amplification factors and perform the two measurements can take longer than a single subframe. Accordingly, different subframes may be used to perform the two different measurements. The different subframes may be adjacent or non-adjacent, with a second direction signal subframe or a special subframe occurring between the first and second selected subframes.

In a frequency division duplex (FDD) repeater system, with separate UL and DL paths, an oscillation can occur fairly quickly. However, in a TDD repeater system, the system can be switched between UL and DL on a subframe by subframe basis. How often the repeater system is switched between subframes is determined by the TDD UL/DL frame configuration. This will be discussed more fully in the proceeding paragraphs. Switching between UL and DL on a subframe basis can involve switching every 1 ms, or even shorter periods. An oscillation may take longer than 1 ms to build up to a point at which the amplifiers are saturated. This can enable the TDD repeater to operate at amplification levels that would typically cause oscillation, but the oscillation may be dampened by frequent switching between UL and DL. However, when the base station or UE use an UL/DL configuration that uses multiple concurrent (adjacent) subframes (i.e. multiple adjacent UL subframes without DL or special subframes between them), it may cause the TDD repeater to oscillate. The oscillation may damage the amplifiers in the repeater. The oscillation can also cause saturation of the OFDM UL signal received at the base station, which can diminish the ability of the base station to receive the UL signals from multiple UEs included in the received UL OFDM signal. Accordingly, the TDD repeater can monitor UL signals and perform power measurements of subframes that include multiple adjacent UL subframes to ensure that oscillation does not occur. Oscillation detection can be performed on the multiple adjacent UL subframes.

In one example, a cellular repeater can include a first port, a second port, and one or more amplification paths coupled between the first port and the second port. The repeater can be configured to determine a presence of in-band non-cellular signals in a selected first-direction frequency band, and initiate a network protection action when the in-band non-cellular signals are present. In one example, a network protection action is adjusting a system UL gain or noise power based on the received signal power for the DL signal, such as the signal power in a first set of one or more TDD DL subframes. In one example, a repeater can be configured to receive a control signal for a first-direction signal in a first frequency band; and send a power level indicator for the first-direction signal in the first frequency band to the repeater. The repeater can be configured to receive a power level indicator for the first-direction signal in the first frequency band from a modem, and calculate a gain or noise power level from the power level indicator for the first-direction or second-direction signal in the first frequency band. The repeater can adjust its system gain or noise power to an allowable level in order to be operable for network protection, based on government or industry standards.

In one example, a repeater can be configured to transmit a downlink (DL) signal in a millimeter wave (mm Wave) frequency range, and transmit an uplink (UL) signal in a sub-6 gigahertz (GHz) frequency range. In this example, a mm Wave frequency range can be a frequency between 6 GHz and 300 GHz. The repeater can be both a TDD repeater, such as the example TDD repeater illustrated in FIGS. 5a and 5b, and an FDD repeater, such as the example FDD repeater illustrated in FIG. 4. The TDD/FDD repeater can be configured to receive and transmit on multiple FDD and TDD bands.

In an example, FDD bands, such as 3GPP 4G FDD bands, or 5G FDD bands can be used to transmit important information, such as control channel information in a sub-6 gigahertz (GHz) frequency range. TDD bands can transmit large data sets using broadband FR2 bands. In one embodiment, the FDD bands can be used to transmit UL channels. The UL channels can include control channel information. Alternatively, the FDD bands can be used to transmit UL for both control information and data. Downlink data typically includes larger data sets. Accordingly, TDD bands in higher frequency ranges, such as 3GPP bands in the frequency range between 6 GHz and 300 GHz can be used to transmit DL data including FR2 bands and millimeter wave bands. The DL control information may be communicated using the TDD bands. Alternatively, both UL control information and DL control information can be sent to an anchor base station using FDD bands, while data can be sent using TDD bands to one or more secondary base stations or to the anchor base station if it is configured to receive both FDD and TDD communication. The repeater can be configured to receive, filter, amplify, and transmit any combination of FDD/TDD UL and DL transmissions between a UE and a base station in 4G or 5G bands.

Figure 2:
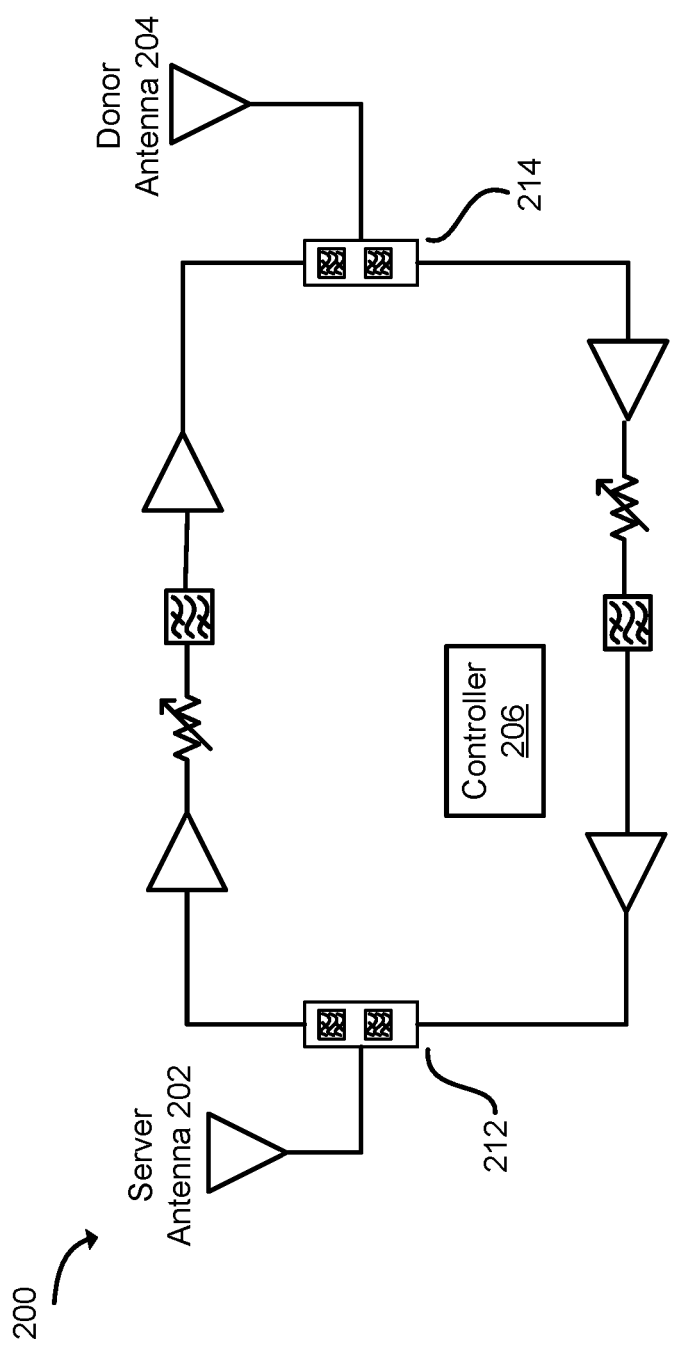
FIG. 2 illustrates a repeater in accordance with an example.

In an example, as illustrated in FIG. 2, a bi-directional repeater system can comprise a repeater 200 connected to a donor antenna 204 and a server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. The PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 206. In one example, the controller 206 can include one or more processors and memory.

In some embodiments the controller 206 can adjust the gain of the first path and/or the second path based on wireless communication conditions. If included in the repeater 200, the controller 206 can be implemented by any suitable mechanism, such as a program, software, function, library, software as a service, analog or digital circuitry, or any combination thereof. The controller 206 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the first path and/or the second path. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

Figure 3:
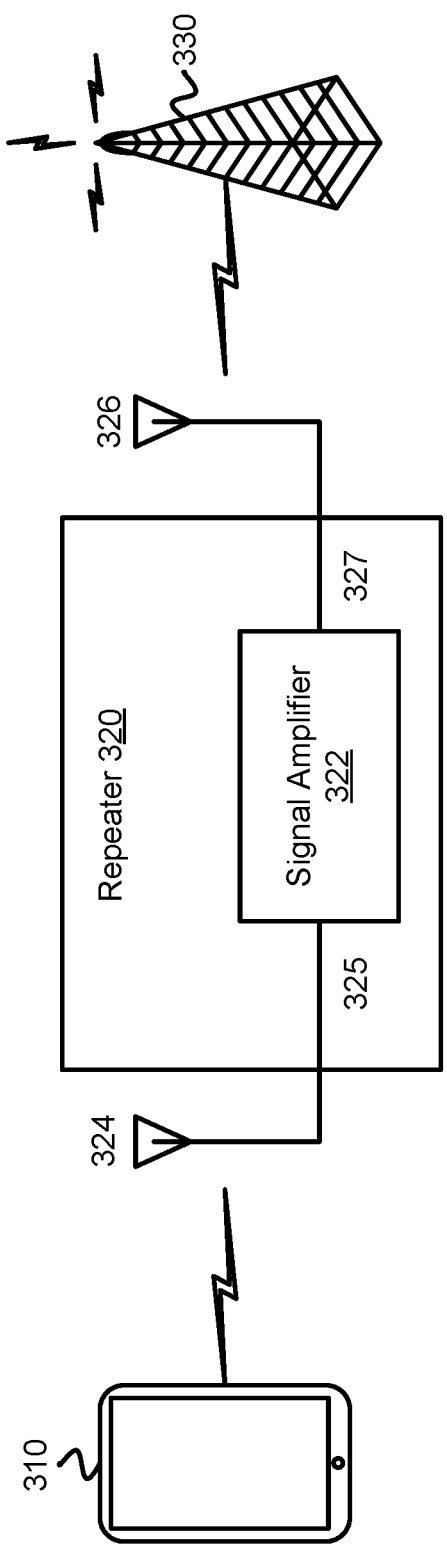
FIG. 3 illustrates a repeater in communication with a user equipment (UE) and a base station (BS) in accordance with an example.

FIG. 3 illustrates an exemplary repeater 320 in communication with a wireless device 310 and a base station 330. The repeater 320 (also referred to as a cellular signal amplifier) can increase the quality of wireless communication by amplifying, filtering, and/or applying other processing techniques via a signal amplifier 322 to uplink signals communicated from the wireless device 310 to the base station 330 and/or downlink signals communicated from the base station 330 to the wireless device 310. In other words, the repeater 320 can amplify or boost uplink signals and/or downlink signals bi-directionally. In one example, the repeater 320 can be at a fixed location, such as in a home or office. Alternatively, the repeater 320 can be attached to a mobile object, such as a vehicle or a wireless device 310. The repeater can be a signal booster, such as a cellular signal booster.

In one configuration, the repeater 320 can be configured to be connected to a device antenna 324 (e.g., an inside antenna, server antenna, or a coupling antenna) and a node antenna 326 (e.g., an outside antenna or donor antenna). The node antenna 326 can receive the downlink signal from the base station 330. The downlink signal can be provided to the signal amplifier 322 via a second coaxial cable 327 or other type of wired, wireless, optical, or radio frequency connection operable to communicate radio frequency signals. The signal amplifier 322 can include one or more radio signal amplifiers for amplification and filtering of cellular signals. The downlink signal that has been amplified and filtered can be provided to the device antenna 324 via a first coaxial cable 325 or other type of radio frequency connection operable to communicate radio frequency signals. The device antenna 324 can communicate the downlink signal that has been amplified and filtered to the wireless device 310.

Similarly, the device antenna 324 can receive an uplink signal from the wireless device 310. The uplink signal can be provided to the signal amplifier 322 via the first coaxial cable 325 or other type of wired, wireless, optical, or radio frequency connection operable to communicate radio frequency signals. The signal amplifier 322 can include one or more radio signal amplifiers for amplification and filtering of cellular signals. The uplink signal that has been amplified and filtered can be provided to the node antenna 326 via the second coaxial cable 327 or other type of wired, wireless, optical, or radio frequency connection operable to communicate radio frequency signals. The node antenna 326 can communicate the uplink signal that has been amplified and filtered to a node, such as a base station 330.

In one embodiment, the device antenna 324 and the node antenna 326 can be integrated as part of the repeater 320. Alternatively, the repeater 320 can be configured to be connected to a separate device antenna 324 or node antenna 326. The device antenna and the node antenna may be provided by a different provider than the repeater 320.

In one example, the repeater 320 can send uplink signals to a node and/or receive downlink signals from the node. While FIG. 3 shows the node as a base station 330, this is not intended to be limiting. The node can comprise a wireless wide area network (WWAN) access point (AP), a base station (BS), an evolved Node B (eNB), a next generation Node B (gNB), a new radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the repeater 320 can include a battery to provide power to various components, such as the signal amplifier 322, the device antenna 324, and the node antenna 326. The battery can also power the wireless device 310 (e.g., phone or tablet). Alternatively, the repeater 320 can receive power from the wireless device 310.

In one configuration, the repeater 320 can be a Federal Communications Commission (FCC)-compatible consumer repeater. As a non-limiting example, the repeater 320 can be compatible with FCC Part 20 or 47 Code of Federal Regulations (C.F.R.) Part 20.21 (Apr. 18, 2018). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 320 can be configured to automatically self-monitor its operation to ensure compliance with applicable noise and gain limits. The repeater 320 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 320 can enhance the wireless connection between the wireless device 310 and the base station 330 (e.g., cell tower) or another type of wireless wide area network (WWAN) access point (AP) by amplifying desired signals relative to a noise floor. The repeater 320 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 320 can boost signals for 3GPP LTE Release 16.5.0 (March 2020) or other desired releases.

The repeater 320 can boost signals from the 3GPP Technical Specification (TS) 36.101 (Release 16 Mar. 2020) bands or LTE frequency bands. For example, the repeater 320 can boost signals from the LTE frequency bands: 2, 4, 5, 12, 13, 17, 25, and 26. In addition, the repeater 320 can boost selected frequency bands based on the country or region in which the repeater is used, including any of bands 1-53, 65-76, 85, 87, or 88, or other bands, as disclosed in 3GPP TS 36.104 V16.5.0 (March 2020), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| 30[15] | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD[2] |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD[8] |
| 47 | 5855 MHz-5925 MHz | 5855 MHz-5925 MHz | TDD[11] |
| 48 | 3550 MHz-3700 MHz | 3550 MHz-3700 MHz | TDD |
| 49 | 3550 MHz-3700 MHz | 3550 MHz-3700 MHz | TDD[16] |
| 50 | 1432 MHz-1517 MHz | 1432 MHz-1517 MHz | TDD[13] |
| 51 | 1427 MHz-1432 MHz | 1427 MHz-1432 MHz | TDD[13] |
| 52 | 3300 MHz-3400 MHz | 3300 MHz-3400 MHz | TDD |
| 53 | 2483.5 MHz-2495 MHz | 2483.5 MHz-2495 MHz | TDD |
| ... | | | |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD[4] |
| 67 | N/A | 738 MHz-758 MHz | FDD[2] |
| 68 | 698 MHz-728 MHz | 753 MHz-783 MHz | FDD |
| 69 | N/A | 2570 MHz-2620 MHz | FDD[2] |
| 70 | 1695 MHz-1710 MHz | 1995 MHz-2020 MHz | FDD[10] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD[2] |
| 76 | N/A | 1427 MHz-1432 MHz | FDD[2] |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

NOTE 1:
Band 6, 23 is not applicable
NOTE 2:
Restricted to E-UTRA operation when carrier aggregation is configured. The downlink operating band is paired with the uplink operating band (external) of the carrier aggregation configuration that is supporting the configured Pcell.
NOTE 3:
A UE that complies with the E-UTRA Band 65 minimum requirements in this specification shall also comply with the E-UTRA Band 1 minimum requirements.
NOTE 4:
The range 2180-2200 MHz of the DL operating band is restricted to E-UTRA operation when carrier aggregation is configured.
NOTE 5:
A UE that supports E-UTRA Band 66 shall receive in the entire DL operating band
NOTE 6:
A UE that supports E-UTRA Band 66 and CA operation in any CA band shall also comply with the minimum requirements specified for the DL CA configurations CA_66B, CA_66C and CA_66A-66A.
NOTE 7:
A UE that complies with the E-UTRA Band 66 minimum requirements in this specification shall also comply with the E-UTRA Band 4 minimum requirements.
NOTE 8:
This band is an unlicensed band restricted to licensed-assisted operation using Frame Structure Type 3
NOTE 9:
In this version of the specification, restricted to E-UTRA DL operation when carrier aggregation is configured.
NOTE 10:
The range 2010-2020 MHz of the DL operating band is restricted to E-UTRA operation when carrier aggregation is configured and TX-RX separation is 300 MHz The range 2005-2020 MHz of the DL operating band is restricted to E-UTRA operation when carrier aggregation is configured and TX-RX separation is 295 MHz.
NOTE 11:
This band is unlicensed band used for V2X communication. There is no expected network deployment in this band so Frame Structure Type 1 is used.
NOTE 12:
A UE that complies with the E-UTRA Band 74 minimum requirements in this specification shall also comply with the E-UTRA Band 11 and Band 21 minimum requirements.
NOTE 13:
UE that complies with the E-UTRA Band 50 minimum requirements in this specification shall also comply with the E-UTRA Band 51 minimum requirements.
NOTE 14:
A UE that complies with the E-UTRA Band 75 minimum requirements in this specification shall also comply with the E-UTRA Band 76 minimum requirements.
NOTE 15:
Uplink transmission is not allowed at this band for UE with external vehicle-mounted antennas.
NOTE 16:
This band is restricted to licensed-assisted operation using Frame Structure Type 3

In another configuration, the repeater 320 can boost signals from the 3GPP Technical Specification (TS) 38.104 (Release 16 Mar. 2020) bands or 5G frequency bands. In addition, the repeater 320 can boost selected frequency bands based on the country or region in which the repeater is used, including any of bands n1-n95 in frequency range 1 (FR1), n257-n261 in frequency range 2 (FR2), or other bands, as disclosed in 3GPP TS 38.104 V16.3.0 (March 2020), and depicted in Table 2 and Table 3:

TABLE 2

| NR operating band | Uplink (UL) operating band BS receive / UE transmit $F_{UL, low}$-$F_{UL, high}$ | Downlink (DL) operating band BS transmit / UE receive $F_{DL, low}$-$F_{DL, high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |

TABLE 2-continued

| NR operating band | Uplink (UL) operating band BS receive / UE transmit $F_{UL,\,low}$-$F_{UL,\,high}$ | Downlink (DL) operating band BS transmit / UE receive $F_{DL,\,low}$-$F_{DL,\,high}$ | Duplex mode |
|---|---|---|---|
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |

NOTE 1:
This band is applicable in China only.
NOTE 2:
Variable duplex operation does not enable dynamic variable duplex configuration by the network, and is used such that DL and UL frequency ranges are supported independently in any valid frequency range for the band.

TABLE 3

| NR operating band | Uplink (UL) and Downlink (DL) operating band BS transmit/receive UE transmit/receive FUL,low-FUL,high FDL, low-FDL,high | Duplex mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Figure 4:
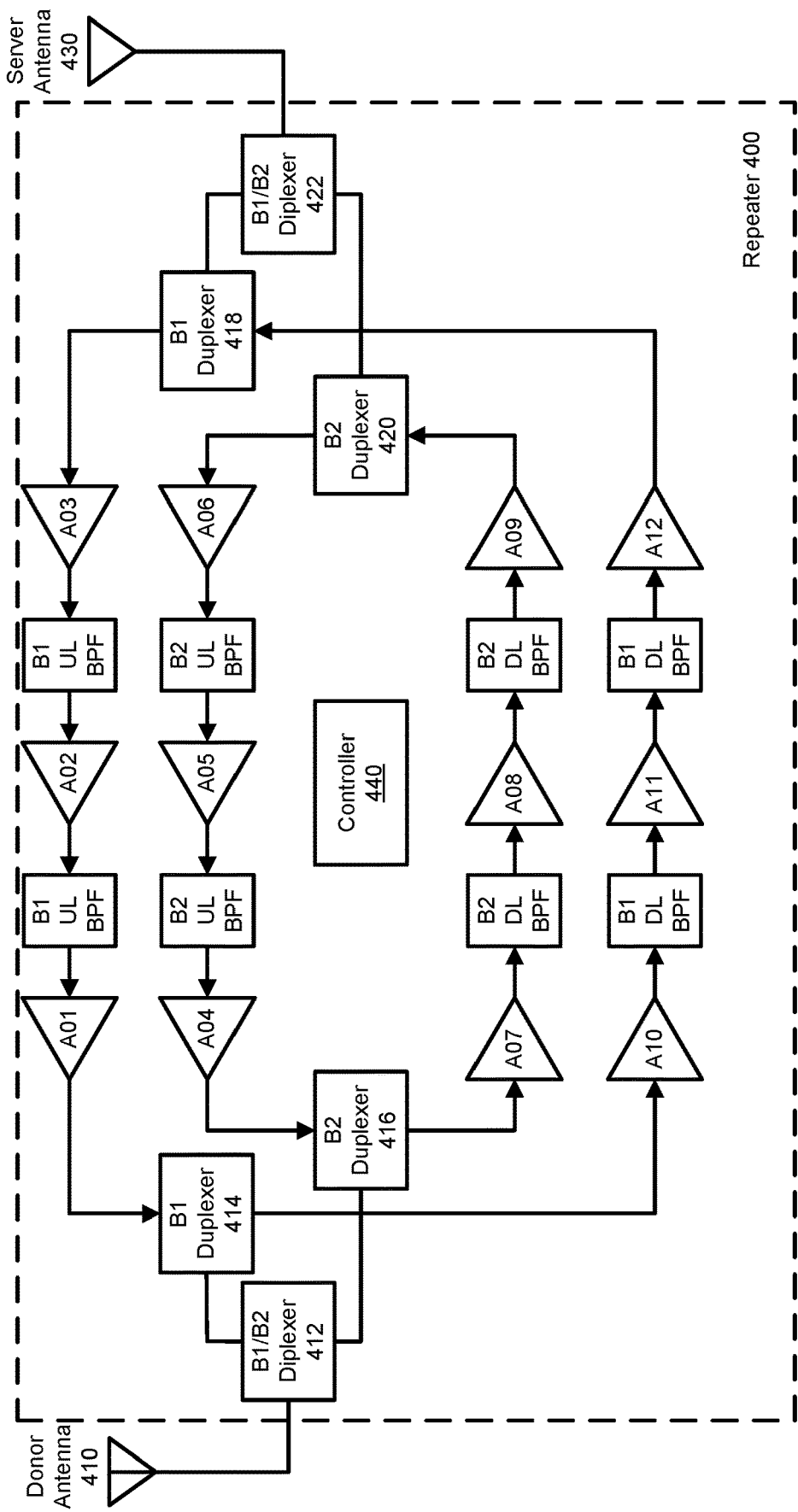
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

Figure 5A:
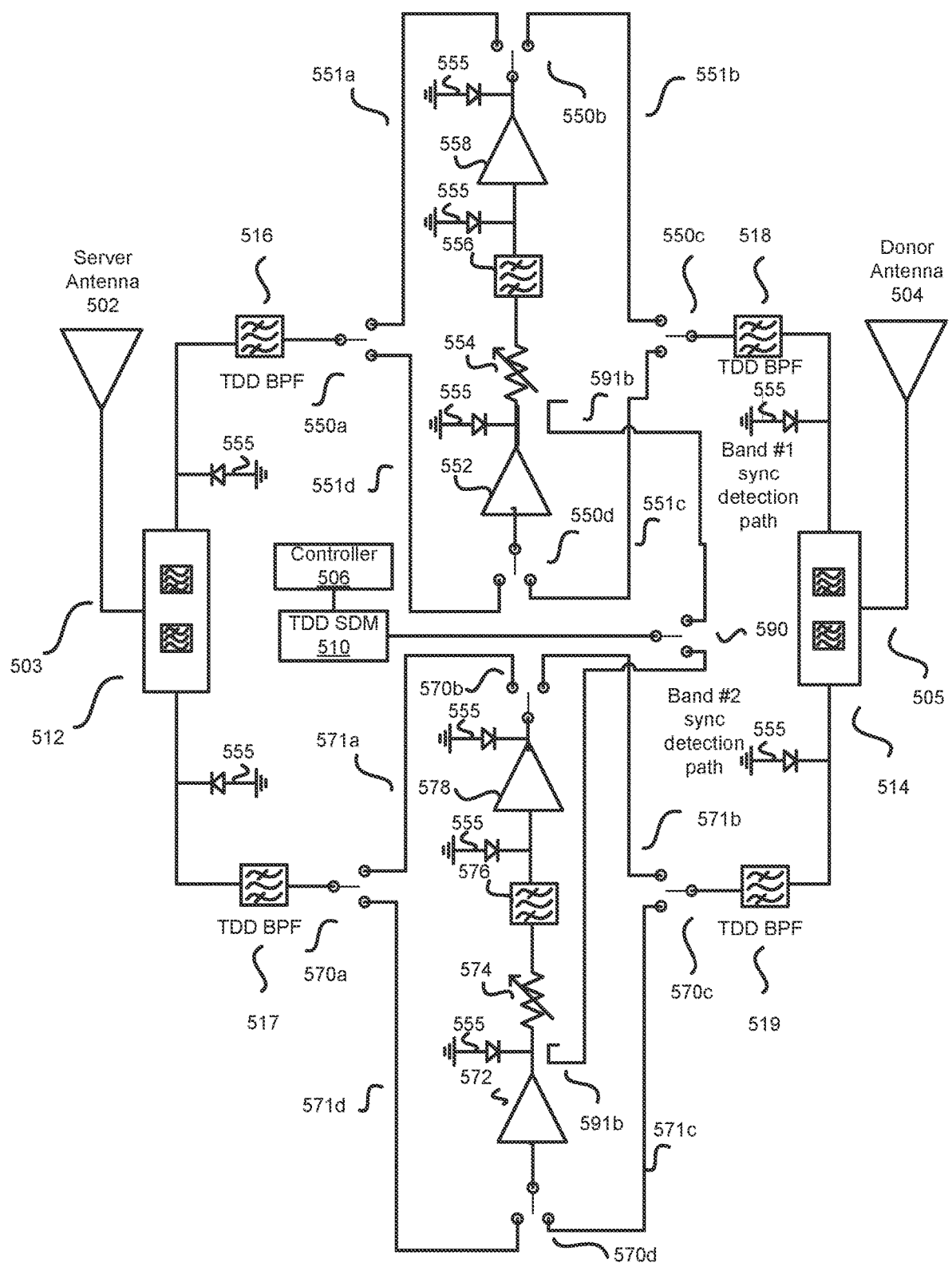
FIG. 5a illustrates a time division duplex (TDD) repeater in accordance with an example.

In another example, as illustrated in FIG. 5a, a repeater can be a time division duplex (TDD) repeater. The repeater can be configured to be coupled to a first antenna (e.g., a server antenna) 502 and a second antenna (e.g., a donor antenna) 504. The first antenna 502 can receive a first-direction signal (e.g., an uplink signal) from a wireless device (e.g., a UE). The first antenna 502 can be configured to be coupled to a first port (e.g., a server port) 503. The first port 503 can be coupled to a multiplexer (or a diplexer, a duplexer, a circulator, or a splitter) 512. The first-direction signal received at the first antenna 502 from the wireless device can be directed to multiplexer 512. The multiplexer 512 can direct the TDD first-direction signal, based on its frequency, to a TDD first path or a TDD second path.

In another example, the second antenna 504 can receive a second-direction signal from a base station. The second antenna 504 can be coupled to a second port (e.g., a donor port) 505. The second port 505 can be coupled to a multiplexer (or a diplexer, a duplexer, a circulator, or a splitter) 514. The second-direction signal received at the second antenna 504 from the base station can be directed to multiplexer 514. The multiplexer 514 can direct the TDD second-direction signal, based on its frequency, to a TDD first path or a TDD second path.

In another example, the TDD first path can comprise a filter (e.g., a TDD band-pass filter (BPF)) 516 that is configured to be coupled to the multiplexer 512 and a filter (e.g., a TDD BPF) 518 that is configured to be coupled to the multiplexer 514. The filter 516 can be configured to be coupled to a first switch 550a (e.g., a single-pole double-throw (SPDT) switch). The first switch 550a can be configured to a second switch 550b (e.g., a single-pole double-throw (SPDT) switch) via 551a. The second switch 550b can be configured to be coupled to a third switch 550c (e.g., a single-pole double-throw (SPDT) switch) via 551b. The third switch 550c can be configured to be coupled to a fourth switch 550d (e.g., a single-pole double-throw (SPDT) switch) via 551c. The fourth switch 550d can be configured to be coupled to the first switch 550a via 551d.

In another example, the fourth switch 550d can be configured to be coupled to an input of a first amplification and filtering path and the second switch 550b can be configured to be coupled to an output of the first amplification and filtering path. The first amplification and filtering path can comprise one or more of a low-noise amplifier (LNA) 552, a variable attenuator 554, a filter (e.g., a TDD band-pass filter (BPF)) 556, or a power amplifier 558. In another example, the power amplifier 558 can comprise a variable gain power amplifier, a fixed gain power amplifier, or a gain block.

In another example, the filter 556 can be configured to pass one or more of a first-direction (e.g., an uplink direction) of a first frequency range (e.g., one or more of 3GPP LTE TDD frequency bands 41, 48, or 49). In another example, the filter 556 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 556 can be configured to communicate a first-direction of a selected channel within a 3GPP LTE TDD band or a 3GPP 5G TDD frequency band. In another example, the filter 556 can be configured to communicate a first-direction of a selected frequency range within a 3GPP LTE TDD frequency range or a first-direction of a 3GPP 5G TDD frequency range.

In another example, after being directed along the TDD first amplification and filtering path, the TDD first-direction signal can be amplified and filtered in accordance with the type of amplifiers and filters included along the TDD first amplification and filtering path. At this point, the TDD first-direction signal can be directed to the second switch 550b. The second switch 550b can direct the TDD first-direction signal to the filter (e.g., a TDD BPF) 518 via the third switch 550c. The filter 518 can direct the TDD first-direction signal to the multiplexer 514. The multiplexer 514 can be coupled to the second port 505. The TDD first-direction signal can be directed from the multiplexer 514 to the second port 505. The TDD first-direction signal can be directed from the second port 505 to the second antenna 504. The second antenna 504 can communicate the amplified and/or filtered TDD first-direction signal to a base station.

In another example, the second antenna 504 can receive a second-direction signal from a base station. The second port 505 can be configured to be coupled to the second antenna 504. The second port 505 can be coupled to the multiplexer 514. The second-direction signal received at the second antenna 504 from the base station can be directed to the multiplexer 514. The multiplexer 514 can direct the TDD second-direction signal, based on its frequency, to the third switch 550c via the filter 518. The TDD second-direction signal can be further directed to the input of the LNA 552 via the fourth switch 550d.

In another example, the filter 556 can be configured to pass one or more of a second-direction (e.g., a downlink direction) of a first frequency range (e.g., one or more of 3GPP LTE TDD frequency bands 41, 48, or 49). In another example, the filter 556 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 556 can be configured to communicate a second-direction of a selected channel within a 3GPP LTE TDD band or a 3GPP 5G TDD frequency band. In another example, the filter 556 can be configured to communicate a second-direction of a selected frequency range within a 3GPP LTE TDD frequency range or a second-direction of a 3GPP 5G TDD frequency range.

In another example, after being directed along the TDD first amplification and filtering path, the TDD second-direction signal can be amplified and filtered in accordance with the type of amplifiers and filters included along the TDD first amplification and filtering path. At this point, the TDD second-direction signal can be directed to the second switch 550b. The second switch 550b can direct the amplified and/or filtered TDD second-direction signal to the multiplexer 516 via the first switch 550a. The multiplexer 512 can be coupled to a first port 503. The TDD second-direction signal can be directed from the multiplexer 512 to the first port 503. The TDD second-direction signal can be directed from the first port 503 to the first antenna 502. The first antenna 502 can communicate the amplified and/or filtered TDD second-direction signal to a wireless device.

In another example, the TDD second path can comprise a filter (e.g., a TDD band-pass filter (BPF)) 517 that is configured to be coupled to the multiplexer 512 and a filter (e.g., a TDD BPF) 519 that is configured to be coupled to the multiplexer 514. The filter 517 can be configured to be coupled to a fifth switch 570a (e.g., a single-pole double-throw (SPDT) switch). The fifth switch 570a can be configured to be coupled to a sixth switch 570b (e.g., a single-pole double-throw (SPDT) switch) via 571a. The sixth switch 570b can be configured to be coupled to a seventh switch 570c (e.g., a single-pole double-throw (SPDT) switch) via 571b. The seventh switch 570c can be configured to be coupled to an eighth switch 570d (e.g., a single-pole double-throw (SPDT) switch) via 571c. The eighth switch 570d can be configured to be coupled to the fifth switch 570a via 571d.

In another example, the eighth switch 570d can be configured to be coupled to an input of a second amplification and filtering path and the sixth switch 570b can be configured to be coupled to an output of the second amplification and filtering path. The second amplification and filtering path can comprise one or more of a low-noise amplifier (LNA) 572, a variable attenuator 574, a filter (e.g., a TDD band-pass filter (BPF)) 576, or a power amplifier 578. In another example, the power amplifier 578 can comprise a variable gain power amplifier, a fixed gain power amplifier, or a gain block.

In another example, the filter 576 can be configured to pass one or more of a first-direction (e.g., an uplink direction) of a second frequency range (e.g., one or more of 3GPP LTE TDD frequency bands 41, 48, or 49). In another example, the filter 576 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 576 can be configured to communicate a first-direction of a selected channel within a 3GPP LTE TDD band or a 3GPP 5G TDD frequency band. In another example, the filter 576 can be configured to communicate a first-direction of a selected frequency range within a 3GPP LTE TDD frequency range or a first-direction of a 3GPP 5G TDD frequency range.

In another example, after being directed along the TDD second amplification and filtering path, the TDD first-direction signal can be amplified and filtered in accordance with the type of amplifiers and filters included along the TDD second amplification and filtering path. At this point, the TDD first-direction signal can be directed to the sixth switch 570*b*. The sixth switch 570*b* can direct the TDD first-direction signal to the filter (e.g., a TDD BPF) 519 via the seventh switch 570*c*. The filter 519 can direct the TDD first-direction signal to the multiplexer 514. The multiplexer 514 can be coupled to the second port 505. The TDD first-direction signal can be directed from the multiplexer 514 to the second port 505. The TDD first-direction signal can be directed from the second port 505 to the second antenna 504. The second antenna 504 can communicate the amplified and/or filtered TDD first-direction signal to a base station.

In another example, the second antenna 504 can receive a second-direction signal from a base station. The second port 505 can be configured to be coupled to the second antenna 504. The second port 505 can be coupled to the multiplexer 514. The second-direction signal received at the second antenna 504 from the base station can be directed to the multiplexer 514. The multiplexer 514 can direct the TDD second-direction signal, based on its frequency, to the seventh switch 570*c* via the filter 519. The TDD second-direction signal can be further directed to the input of the LNA 572 via the eighth switch 570*d*.

In another example, the filter 576 can be configured to pass one or more of a second-direction (e.g., a downlink direction) of a second frequency range (e.g., one or more of 3GPP LTE TDD frequency bands 41, 48, or 49). In another example, the filter 576 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 576 can be configured to communicate a second-direction of a selected channel within a 3GPP LTE TDD band or a 3GPP 5G TDD frequency band. In another example, the filter 576 can be configured to communicate a second-direction of a selected frequency range within a 3GPP LTE TDD frequency range or a second-direction of a 3GPP 5G TDD frequency range.

In another example, after being directed along the TDD second amplification and filtering path, the TDD second-direction signal can be amplified and filtered in accordance with the type of amplifiers and filters included along the TDD second amplification and filtering path. At this point, the TDD second-direction signal can be directed to the sixth switch 570*b*. The sixth switch 570*b* can direct the amplified and/or filtered TDD second-direction signal to the multiplexer 512 via the fifth switch 570*a* and the filter 517. The multiplexer 512 can be coupled to a first port 503. The TDD second-direction signal can be directed from the multiplexer 512 to the first port 503. The TDD second-direction signal can be directed from the first port 503 to the first antenna 502. The first antenna 502 can communicate the amplified and/or filtered TDD second-direction signal to a wireless device.

In another example, the first amplification and filtering path can be configured to switch between amplifying and filtering a first TDD signal in a first frequency range of a first TDD first-direction signal and a first TDD signal in a first frequency range of a first TDD second-direction signal.

In another example, the second amplification and filtering path can be configured to switch between amplifying and filtering a second TDD signal in a second frequency range of a second TDD first-direction signal and a second TDD signal in a second frequency range of a second TDD second-direction signal.

In another example, a repeater can further comprise a layer-1 modem 510.

In another example, the layer-1 modem 510 can be coupled to a ninth switch (e.g., a SPDT switch) 590. The ninth switch 590 can be coupled to one or more detectors 591*a* and one or more detectors 591*b*. The layer-1 modem 510 can be configured to detect UL/DL configuration information for the first TDD signal using the one or more detectors 591*a* and for the second TDD signal using the one or more detectors 591*b*. The one or more detectors 591*a* can be configured to detect the first TDD signal between the LNA 552 and the variable attenuator 554. The one or more detectors 591*b* can be configured to detect the second TDD signal between the LNA 572 and the variable attenuator 574.

In another example, a repeater can comprise a controller 506 that can be configured as previously discussed with respect to the controller 206.

In another example, a repeater can further comprise a controller 506 that can be configured to switch the first switch 550*a* and a fourth switch 550*d* to pass a first-direction TDD signal (e.g., an uplink TDD signal) from the filter 516 to the first amplification and filtering path and switch the second switch 550*b* and the third switch 550*c* to pass the first-direction TDD signal from the output of the power amplifier 558 to the second port 505 via the filter 518 and the multiplexer 514.

In another example, the controller 506 can be configured to switch the third switch 550*c* and the fourth switch 550*d* to pass a second-direction signal (e.g., a downlink TDD signal) from the second port 505 to the TDD first amplification and filtering path and switch the second switch 550*b* and the first switch 550*a* to pass the second-direction TDD signal to the first port 503 via the filter 516 and the multiplexer 512.

In another example, the controller 506 can be configured to switch the fifth switch 570*a* and an eighth switch 570*d* to pass a first-direction TDD signal (e.g., an uplink TDD signal) from the filter 517 to the second amplification and filtering path and switch the sixth switch 570*b* and the seventh switch 570*c* to pass the first-direction TDD signal from the output of the power amplifier 578 to the second port 505 via the filter 519 and the multiplexer 514.

In another example, the controller 506 can be configured to switch the seventh switch 570*c* and the eighth switch 570*d* to pass a second-direction signal (e.g., a downlink TDD signal) from the second port 505 to the TDD second amplification and filtering path and switch the sixth switch 570*b* and the fifth switch 570*a* to pass the second-direction TDD signal to the first port 503 via the filter 517 and the multiplexer 512.

In another example, the repeater can comprise one or more signal detectors or power detectors 555. The one or more power detectors can be located at one or more of: between the filter 556 and the PA 558; between the PA 558 and the adjustable matching network; between the adjustable matching network and the filter 517; or between the filter 517 and the second port 505.

In one example, the TDD repeater can include a signal detector configured to measure a received signal power (e.g., an RSSI) for a downlink (DL) signal in a first set of one or more TDD DL subframes. The TDD DL subframes can be contiguous or non-contiguous. The number of TDD subframes can be x, wherein x is an integer greater than or equal to 1.

In one example, the UL noise power or gain of the one or more amplification paths of the TDD repeater can be adjusted based on a calculation of the received signal power for the DL signal in the first set of the one or more TDD DL subframes. The UL noise power or gain adjustment can be calculated from a weighted average of the received signal power. In one example, DL subframes in a later time period can be weighted greater than DL subframes in an earlier time period.

In one example, the TDD repeater can further comprise an UL donor antenna and a DL donor antenna. The UL donor antenna can be directed in a first direction and the DL donor antenna can be directed in a second direction, wherein the first direction and the second direction are not the same direction. The TDD repeater can use a UL donor antenna and a DL donor antenna to: (a) communicate with different cell towers in an UL direction and a DL direction, or (b) communicate with different cell towers using different frequencies.

In one example, the TDD repeater can be configured to measure a control channel (or reference signal) transmit power from a node (e.g., a base station, a small cell, or a relay node). The TDD repeater can adjust the UL gain or the UL noise power based on the control channel (or reference signal) transmit power. The TDD repeater can adjust the UL gain or the UL noise power to be a higher value or a lower value compared to a previous value.

In one example, a power measurement method for a TDD repeater can include synchronizing a spectrum analyzer to a TDD frame configuration (e.g., TDD frame (e.g., frame configurations 0-6 for 3GPP LTE). The method can include measuring uplink (UL) or downlink (DL) transmitted power over a set of two or more sub-frames (e.g., between two UL subframes or between two DL subframes). The method can include calculating an average noise power measurement from the UL or DL transmitted power over the set of two or more sub-frames. In one example, the two or more subframes can be non-contiguous subframes. In one example, the two or more subframes can be TDD subframes. In one example, the transmitted power can be transmitted noise power. In one example, the method can comprise adjusting the UL transmitted power based on the received signal for the DL signal in the set of the two or more subframes.

In one example, a TDD repeater can be configured to identify when a valid sync is generated; and operate in one or more of an uplink (UL) transmit power OFF mode or a downlink (DL) power OFF mode until the valid sync is generated. The TDD repeater can be configured to operate in a DL-only mode (e.g., a DL power ON mode and an UL transmit power OFF mode) until the valid sync is generated.

In one example, the TDD repeater can be in an UL transmit power ON mode based on the type of signal. In one example, the signal types can include one or more of third generation (3G) signals, fourth generation (4G) signals, long term evolution (LTE) signals, or fifth generation (5G) signals. In one example, the TDD repeater can be in an UL transmit power ON mode for LTE signals when LTE signals are detected, but not in an UL transmit power ON mode for 5G signals when 5G signals are not detected. In one example, the TDD repeater can be in an UL transmit power ON mode for 5G signals when 5G signals are detected, but not in an UL transmit power ON mode for LTE signals when LTE signals are not detected.

In one example, a TDD repeater can be configured to disable UL transmission when the TDD repeater is not transmitting in a UL subframe or prior to an end of a post-UL subframe guard period, and disable DL transmission when the TDD repeater is not transmitting in a TDD DL subframe or prior to the end of the post-DL subframe guard period.

In one example, a TDD repeater can be configured to measure a received signal power (e.g., an RSSI) for a frequency range of a downlink (DL) signal in a selected direction. The TDD repeater can be configured to determine the frequency range availability for the UL signal based on the received signal power for the DL signal in the selected direction. The TDD repeater can be configured to adjust an uplink (UL) gain for the selected direction based on the received signal power for the DL signal in the selected direction. In one example, the frequency range can be contiguous or non-contiguous.

In one example, the TDD repeater can comprise a scanning beam former. The TDD repeater can be configured to mitigate interference caused by the scanning beam former. In one example, the TDD repeater can further comprise an UL donor antenna and a DL donor antenna. The UL donor antenna and the DL donor antenna can be directed in a same direction. The TDD repeater can be configured to measure a control channel (or reference signal) transmit power from the node (e.g., BS) and adjust the UL gain or noise power based on the control channel (or reference signal) transmit power. The UL gain or noise power can be adjusted based on estimated base station coupling loss (BSCL) from the control channel (or reference signal) transmit power.

In one example, the TDD repeater can be configured to receive the base station requested power from a UE and adjust the UL gain or noise power based on the base station requested power.

In one example, a TDD repeater can include a first port, a second port, one or more amplification paths coupled between the first port and the second port, and a signal detector. The signal detector can be configured to measure a power variance for a first-direction signal (e.g., UL signal) in a first set of one or more first-direction subframes (e.g., UL subframes). The repeater can be configured to determine that an oscillation may have occurred in the first-direction signal when the power variance is low, or determine that an oscillation has not occurred in the first-direction signal when the power variance is high. As previously discussed, the oscillation detection may be performed when multiple adjacent UL subframes occur in a TDD UL/DL frame configuration.

In one example, the TDD repeater can be configured to mitigate the oscillation by one or more of: automatic gain reduction (AGC), or disabling a first-direction transmission for the first-direction signal, such as an UL signal; or reduce a gain of the first-direction signal by a predetermined amount. The oscillation in the first-direction signal can be detected and mitigated when the repeater is in a first-direction mode.

In one example, the TDD repeater can determine a maximum noise power level or maximum gain at which oscillation does not occur. The TDD repeater can store the maximum power level or the maximum gain. The TDD repeater can transmit a next subframe in the first direction signal using the stored maximum power level or the stored maximum gain.

In one example, the oscillation can be detected and mitigated within a selected time period, wherein the selected time period is: less than 1 second when the first-direction is a downlink direction, or less than 0.3 seconds when the first-direction is an uplink direction.

In one example, the power variance for the first-direction signal can be determined from one or more of: a peak-to-minimum power ratio, or a peak-to-average power ratio (PARR), or a standard deviation, or a peak-to-minimum power difference.

In one example, a repeater can be configured to transmit a downlink (DL) signal in a millimeter wave (mm Wave) frequency range, such as an FR2 band, and transmit an uplink (UL) signal in a sub-6 gigahertz (GHz) frequency range, such as an FR1 band. The repeater can be configured to receive, filter, and amplify both TDD signals and FDD signals, as previously discussed. The repeater can continue a DL transmit power ON mode for one or more TDD downlink amplification paths of the DL signal in the mm Wave frequency range when one or more UL amplification paths are in a transmit power ON mode in a TDD or FDD band. The TDD repeater can identify when a UL or a sub-6 GHz sync is generated, and operate in an uplink (UL) TDD transmit power OFF mode until the valid sync is generated.

In another example, the DL signal and the UL signal can be in a different frequency range, or the DL signal can be physically isolated from the UL signal (e.g., the server antenna can be in an area that is physically separated (e.g., indoors) from the donor antenna (e.g. outdoors). The mm Wave frequencies can have a high propagation loss which can allow the DL signal to be isolated from the UL signal.

In one example, a cellular repeater can include a first port (e.g., server port), a second port (e.g., donor port), and one or more amplification paths coupled between the first port and the second port. The repeater can be configured to determine a presence of in-band non-cellular signals in a selected first-direction frequency band (e.g., a 3GPP UL frequency band), and initiate a network protection action when the in-band non-cellular signals are present.

In one example, the cellular repeater can be configured to identify the type of non-cellular signal, and initiate a type of network protection action based on the type of non-cellular signal. A scanning receiver can be configured to determine the presence of the in-band non-cellular signals in the selected first-direction frequency band. The scanning receiver can be integrated with the repeater or can be configured to communicate with the receiver from a separate housing.

In another example, the cellular repeater can determine a presence of in-band cellular signals in the selected first-direction frequency band; and either: initiate a second type of network protection action when the in-band cellular signals are present, or initiate a third type of network protection action when both the in-band cellular signal and in-band non-cellular signals are present.

In another example, the network protection action can include a reduction in one or more of a first-direction gain, a first-direction power, or a first-direction noise power, a second-direction gain, a second-direction power, or a second-direction noise power. The network protection action can include filtering out the in-band cellular signals using one or more of intermediate frequency (IF) filters, surface acoustic wave (SAW) filters, or digital filters. The cellular repeater can determine that in-band non-cellular signals in the selected first-direction frequency band are not present based on a location of the repeater or based on a regional licensing structure (e.g., whether a governmental agency such as the FCC permits non-cellular signals in the location.)

In one example, a repeater can be configured to receive a control signal for a first-direction signal (e.g., UL signal) in a first frequency band (e.g., 3GPP frequency band); and send a power level indicator for the first-direction signal in the first frequency band to a repeater. The repeater can be configured to receive a power level indicator for the first-direction signal in the first frequency band from a modem, and calculate a gain or noise power level from the power level indicator for the first-direction or second-direction signal in the first frequency band.

In one example, a TDD repeater is configured to transmit a filtered, amplified TDD uplink (UL) signal and transmit a filtered, amplified TDD downlink (DL) signal simultaneous with the UL signal transmission after determining a gain level for the filtered, amplified TDD UL signal to enable network protection.

In one example, the TDD repeater can comprise a TDD UL amplification and filtering path, such as the first-direction path illustrated in FIG. 5a. The TDD repeater can further comprise a TDD DL amplification and filtering path, such as the second-direction path illustrated in FIG. 5a. The TDD repeater can be further configured to: perform UL to DL interference cancellation; and perform DL to UL interference cancellation to reduce interference between the TDD UL amplification and filtering path and the TDD DL amplification and filtering path.

Figure 5B:
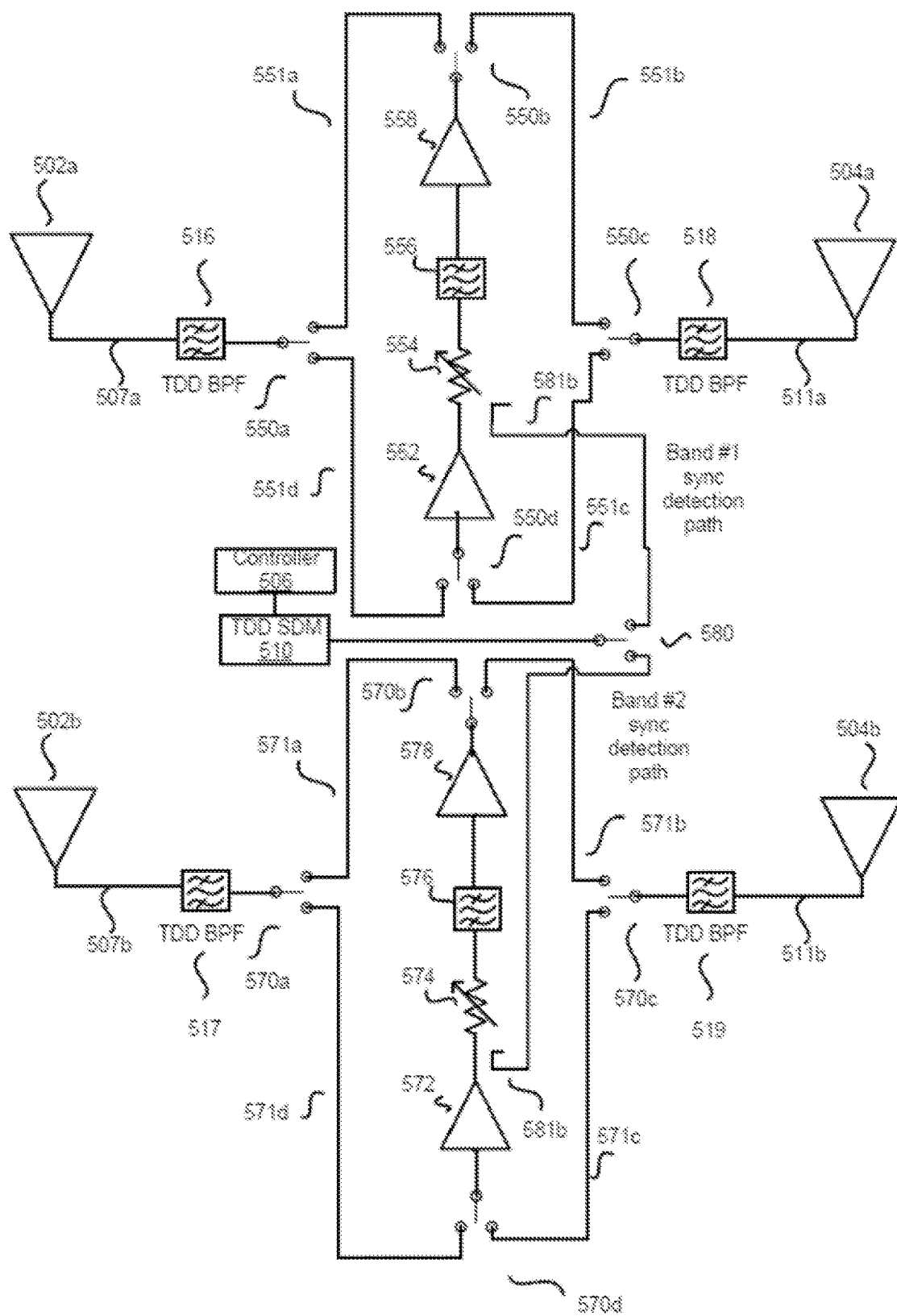
FIG. 5b illustrates a TDD repeater with separate donor and/or server antennas in accordance with an example.

In one example, a TDD repeater can include separate donor and server antennas. FIG. 5b provides an example illustration of the TDD repeater of FIG. 5a, with a first server antenna 502a and a second server antenna 502b. Similarly, a first donor antenna 504a and a second server antenna 504b are illustrated. While FIG. 5b illustrates both separate server antennas 502a, 502b and separate donor antennas 504a, 504b, it is not intended to be limiting. For example, the TDD repeater may include a single server antenna 502, as illustrated in FIG. 5a, and separate donor antennas 504a, 504b, as illustrated in FIG. 5b. Alternatively, the TDD repeater may include a single donor antenna 504, as illustrated in FIG. 5a, and separate server antennas 502a, 502b, as illustrated in FIG. 5b.

In one example, a TDD repeater can comprise a first TDD UL donor port 511a configured to be coupled to a first donor antenna 504a and a first TDD DL donor port 511b configured to be coupled to a second donor antenna 504b. The TDD repeater can also (or alternatively) include a first TDD DL server port 507b configured to be coupled to a first server antenna 502b and a first TDD UL donor port 507a configured to be coupled to a second server antenna 502a.

In one example, the modem can comprise one or more of a scanning receiver, an application specific integrated circuit (ASIC), a field-programmable gate array (FPGA), or the like. The control signal can be received by the modem from a UE or a node (e.g., a BS a small cell node, or a relay node).

In another example, the modem or scanning receiver can be configured to operate as a third generation partnership project (3GPP) long term evolution (LTE) layer-1 modem that can be configured to scan the one or more frequency bands and demodulate information in a downlink layer 1 signal without demodulating LTE layer-2 or LTE layer-3 signals. The modem can further support LTE layer-2 and LTE layer-3 functionality. The layer-1 modem can scan the one or more frequency bands without receiving handshake information or communication back to the source of the transmission (e.g., base station). The terms modem and layer-1 modem are used interchangeably in this document.

In one example, the layer-1 modem can be configured to operate in an LTE TDD repeater. The layer-1 modem can demodulate a downlink layer-1 signal from a node, such as a base station, and use the information to derive the cell's timing for synchronization purposes and the TDD UL/DL frame configuration to enable the TDD repeater to switch between UL subframes and DL subframes in a DL signal received from the base station, or in an UL signal transmitted from a UE. Layer 1 of the downlink LTE protocol stack, also known as the physical layer, contains all of the information needed to synchronize the repeater with the base station and determine the TDD UL/DL frame configuration.

The term "layer-1 modem" is a modem that can demodulate and decode physical channel signals present on layer1 downlink signals from the base station to derive the TDD UL/DL frame configuration information and timing information. The modem can also modulate information. The scanning receiver can receive the same information as the layer-1 modem, but cannot modulate information. No additional higher-level (i.e. Layer 2 or above) communication from the base station or cellular system or exchange of signals (i.e. UL signals) with the base station is used to determine the TDD UL/DL configuration and timing information. The layer 1 physical channels can include the paging channel, the broadcast channel, the downlink shared channel, the multicast channel, the physical broadcast channel (PBCH), the physical downlink control channel (PDCCH), the physical downlink shared channel (PDSCH), and the physical multicast channel (PMCH).

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (i.e. cell's) TDD UL/DL frame configuration information is carried in the SIB1 message. The layer-1 modem can decode the SIB1 message to determine the TDD UL/DL frame configuration, and communicate this information to the TDD repeater.

The process of attaining timing and frequency synchronization and cell ID of a BS cell is accomplished in a cell search. During a cell search, the layer-1 modem can acquire basic information including cell ID, duplexing mode, timing, and frequency related to the BS and cell it's operating in.

The layer-1 modem can receive the primary synchronization signal (PSS) and the secondary synchronization signal (SSS) from the BS. The PSS and SSS can be used to obtain synchronization information to synchronize the layer-1 modem with the BS. As used herein, a valid sync is generated when the TDD repeater is synchronized to the timing received in the physical layer signal received from the BS that includes the PSS and SSS signals.

The layer-1 modem can receive the MIB in the PBCH. The MIB, PSS, and SSS all lie in the central 72 subcarriers (6 resource blocks RB) of the system bandwidth in the downlink signal and are broadcast as physical channels, allowing the layer-1 modem to initially demodulate just this central region.

Demodulating the PSS during the cell search provides the cell identity N(ID_2). The SSS can then be demodulated with the N(ID_2) to give the cell group identity N(ID_1). Given N(ID_1) and N(ID_2), the cell identity N(ID_Cell) can be determined. The PSS is mapped to different orthogonal frequency division multiplexing (OFDM) symbols depending on which frame type is used. Frame type 1 is frequency division duplex (FDD), and frame type 2 is time division duplex (TDD). Observing the demodulated SSS scrambled sequences allows the layer-1 modem to estimate frame timing used for synchronization.

After the cell search and frequency/timing offset corrections are applied, the PBCH is decoded which drives BCH decoding and then MIB data generation. Note that both PBCH and BCH are both associated with Layer 1 signaling.

The MIB is used for SIB recovery and the following processes: the Physical Control Format Indicator Channel (PCFICH) demodulation, CFI decoding; the Downlink control information (DCI) is recovered to configure the PDSCH demodulator & decode the DL-SCH; the PDCCH decoding, the blind PDCCH search; and the SIB bits recovery from the PDSCH demodulation and DL-SCH decoding. Again, note that the physical channels referenced above that are used to recover the SIB are available on layer 1. Once the SIB is recovered (SIB CRC=0), the SIB1 message can be decoded to extract the cell's TDD configuration.

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (or cell's) TDD UL/DL frame configuration information is carried in the SIB1 message. The layer-1 modem can decode the SIB1 message to determine the TDD UL/DL frame configuration, and communicate this information to the TDD repeater. These processes will be described in more detail in the proceeding paragraphs.

Figure 5C:
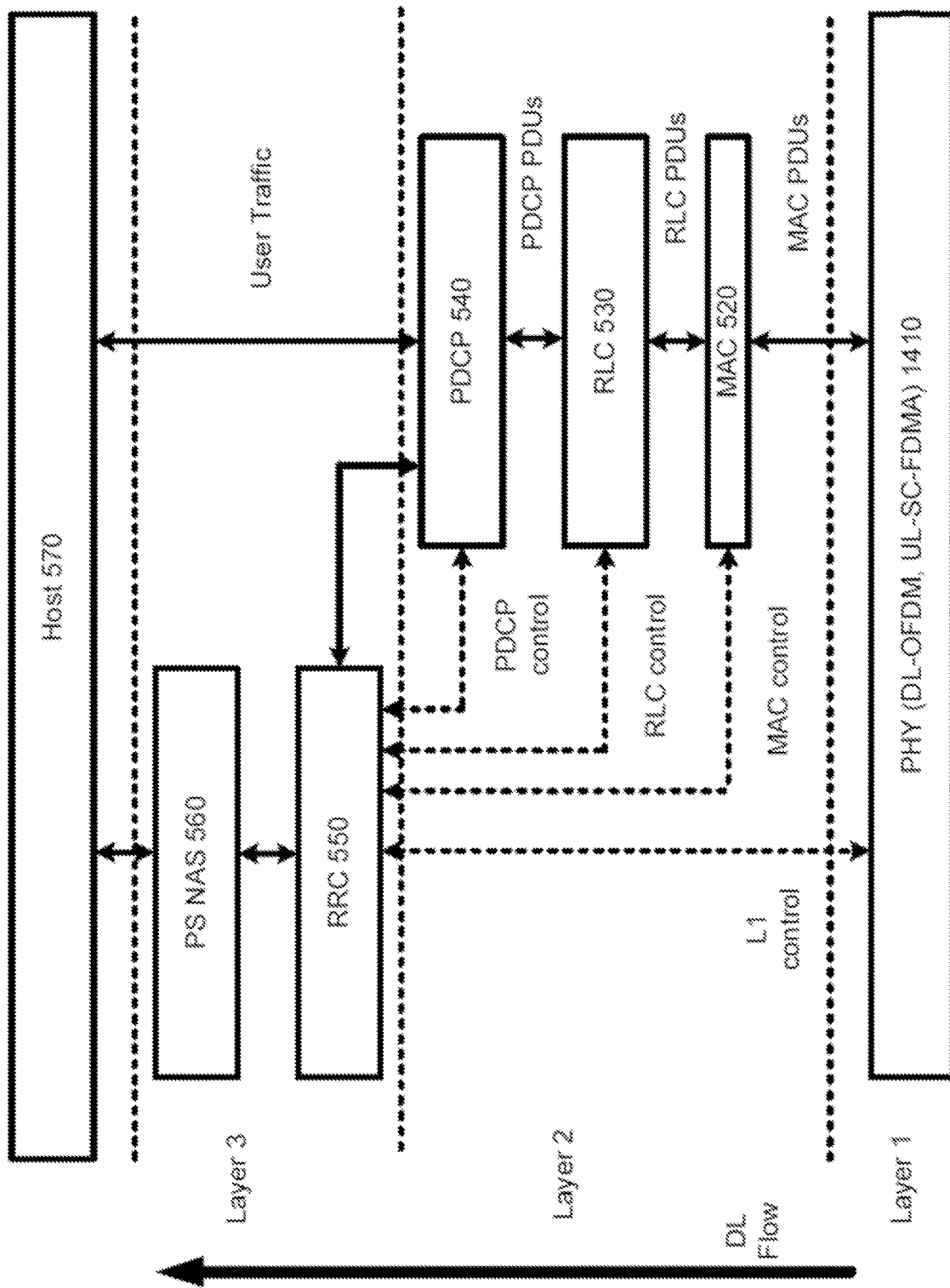
FIG. 5c illustrates a long term evolution (LTE) downlink (DL) radio protocol stack in accordance with an example.
Figure 5D:
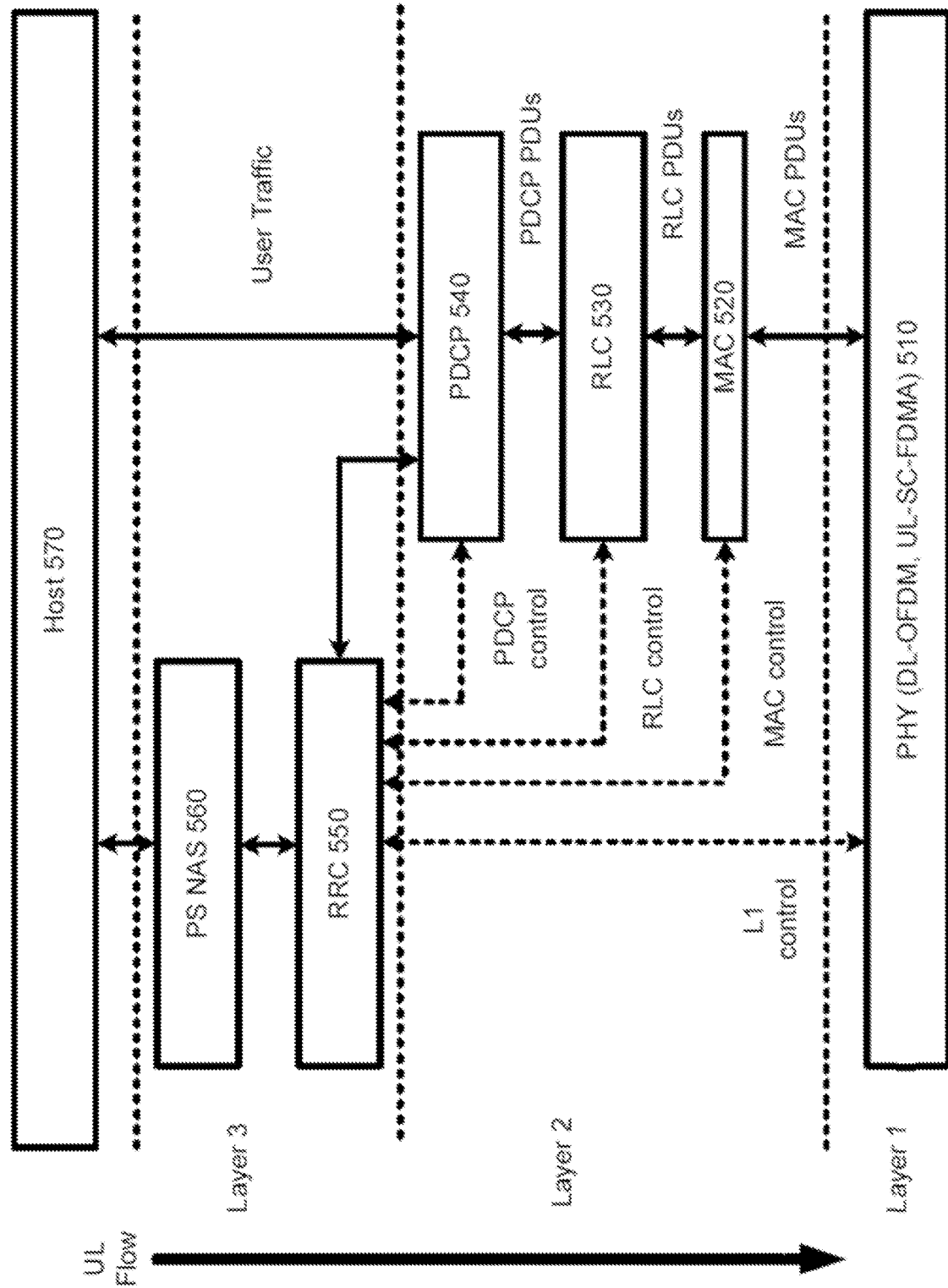
FIG. 5d illustrates a long term evolution (LTE) uplink (UL) radio protocol stack in accordance with an example.

In another example, as illustrated in FIGS. 5c and 5d, a downlink direction can progress from layer 1 to layer 3 and an uplink direction can progress from layer 3 to layer 1. In a DL direction, information can flow from the physical (PHY) layer 510 to the medium-access control (MAC) layer 520 to the radio link control (RLC) layer 530, to the packet data convergence protocol (PDCP) layer 540, and to the host 570. Information can also flow from the physical layer 510 to the radio resource control (RRC) layer 550 to the non-access stratum (NAS) 560, and to the host 570. Control information can also flow from the PHY 510, MAC 520, RLC 530, and PDCP 540 to the RRC 550. In an UL direction, information can flow in the opposite direction.

Layer 1 of the LTE stack can support: (i) DL and UL parameters (e.g. resource blocks, subcarriers per resource block, and subcarrier bandwidth), (ii) physical parameters (e.g., cyclic prefix (CP) length), (iii) 3GPP operation bands (e.g. FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the MAC layer, the RLC layer, and the PDCP layer. Layer 3 of the LTE stack can include the RRC layer and the NAS layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In one example, the modem (i.e. layer-1 modem) can be configured to receive the System Information Block 1 (SIB1) and/or Master Information Block (MIB) broadcast from the base station. The base station typically broadcasts the SIB and MIB information periodically. The layer-1 modem can also be configured to receive the Primary Synchronization Signal (PSS) and the Secondary Synchronization Signal (SSS).

The layer-1 modem can use the PSS to perform time synchronization of the TDD repeater with the base station that broadcast the PSS. The PSS can be used to enable the TDD repeater to perform radio frame, sub-frame, slot and symbol synchronization in the time domain, and enable the TDD repeater to determine a center of the channel bandwidth in the frequency domain. The PSS is broadcast by a 3GPP LTE base station twice in each radio frame. For TDD, the PSS is broadcast using the central 62 subcarriers belonging to the third symbol of time slot 2 (sub-frame 1) and the third symbol of time slot 12 (sub-frame 6) in each radio frame.

The layer-1 modem can receive the SSS, which can be used to perform frequency synchronization of the TDD repeater with the base station that broadcast the SSS. After the primary sync signal acquisition, the modem can be configured to detect the secondary synchronization signal. Secondary synchronization signals are one of 168 codes which are 62-bit sequences. The SSS is broadcast twice within every radio frame. The two transmissions of the SSS are different so the layer-1 modem can detect which is the first and which is the second. For TDD, the SSS is broadcast using the central 62 subcarriers belonging to the last symbol of time slot 1 (subframe 0) and the last symbol of time slot 11 (subframe 5) in each radio frame.

The SSS can be used by the layer-1 modem and TDD repeater to achieve radio frame synchronization and deduce a pointer towards 1 of 168 Physical layer Cell Identity (PCI) groups to determine the PCI of the transmitting base station. In one example, the PCI can be used to: determine a cell size for the base station based on the cell ID. The cell size can be used to determine a distance between the TDD repeater and the base station. In one embodiment, the timing of the TDD repeater can be synchronized with a timing of the base station when the Cell ID is within a valid Cell ID Group or Cell ID Sector.

In one example, the TDD repeater can be configured to receive and transmit broadband channels, such as 3GPP LTE TDD Channel 41. The Channel 41 has a band from 2496 MHz to 2690 MHz, with a bandwidth of 194 MHz. The band is further divided into channels. Certain channels are designated for TDD cellular communication. Other channels are designated for use in non-cellular communications, such as Multichannel Multipoint Distribution Service (MMDS) for the wireless communication of cable television. In one example embodiment, the TDD repeater can be configured to determine selected channels that are received at the TDD repeater to amplify. For instance, the TDD repeater may only amplify channels designated for cellular communications based on the cellular communications repeater standards. A TDD UL/DL configuration for each selected channel can be determined based on information received from the layer-1 modem. The TDD repeater can then perform amplification and/or filtering on the selected channels. In one embodiment, amplification and filtering may only be performed on channels having a same TDD UL/DL configuration and/or the selected channels that are synchronized.

In one example, the layer-1 modem can be configured to receive timing information (i.e. the PSS and SSS) and communicate the timing information to the TDD repeater to determine a valid synchronization of the TDD repeater relative to a base station transmitting downlink signals to the TDD repeater. The TDD repeater can use the timing information to switch from UL transmission at the TDD repeater to DL transmission at the TDD repeater. In one example, the switch from DL to UL transmission can occur at a beginning of a user equipment (UE) timing advance period or during the UE timing advance period.

In one example, there are two types of synchronization to be concerned with at the TDD repeater: cell signal synchronization and booster UL/DL switch timing synchronization. Cell signal synchronization is achieved and validated when the PSS and SSS signals from the eNodeB are detected and time-frequency correlated by layer-1 modem in the repeater.

Once the eNodeB cell signal is synchronized to the layer-1 modem, the access mode can be validated (FDD or TDD) at the repeater. If TDD is validated, the UL/DL subframe configuration can be established. From that UL/DL subframe configuration, the special subframe timing is established. The special subframe timing can be used as the source of the repeater's UL/DL switch timing synchronization.

In one example, the TDD repeater can be configured to determine selected channels that are received at the TDD repeater to amplify. For example, the repeater may be configured to receive and amplify selected TDD channels in the 3GPP LTE or NR list of channels. For each selected channel, the TDD repeater can determine a TDD UL/DL configuration, using the layer-1 modem. The TDD repeater can then perform amplification on the selected channels that have a same TDD UL/DL configuration, or perform amplification on the selected channels that are synchronized.

In one example, a weak downlink signal can be received on channels with a low threshold received signal strength indicator (RSSI). The TDD repeater can be configured so that it does not synchronize with the weak downlink signals because transmitting these signals from the TDD repeater would not interfere with the cellular network. Accordingly, the TDD repeater can be operated on the selected channels that have a DL RSSI less than a threshold.

In another example, the TDD can be further configured to measure a DL received signal strength indicator (RSSI) for each of the selected channels. The TDD repeater may only synchronize with selected channels that have a DL RSSI less than a selected threshold. For example, an RSSI with a threshold that is less than −60 dBm.

In another example, TDD repeater can be further configured to periodically receive, via the layer-1 modem, the PSS and the SSS for each of the selected channels. The TDD repeater can be configured to verify that it is synchronized in time with the selected channels based on the periodically received PSS and SSS, as previously discussed. For example, the TDD repeater can be configured to synchronize with information in the PSS ever time the PSS is received. Alternatively, the TDD repeater may be synchronized over a longer period, such as ever second, or every few seconds. In one example, when a consistent synchronization occurs over a set number of cycles, the periodic check can be extended over a longer period, such as once per minute.

In 5G new radio (NR), the MIB and SIB1 are known as Minimum System Information. The SIB1 alone can be referred as Remaining Minimum System Information or RMSI.

In one example, the layer-1 modem can be configured to receive a master information block (MIB). The MIB is typically broadcast on a physical broadcast channel (PBCH) by the base station in a 4G or 5G architecture. The MIB includes the necessary parameters used by the layer-1 modem to decode the System Information Block Type 1 (SIB1). The MIB is broadcast with a periodicity of about 80 ms (i.e. every 8 frames). Within the periodicity, repetitive transmission of a same MIB can occur. In 5G, the MIB is typically transmitted on OFDM symbols 1, 2 and 3. The MIB is broadcast using subcarrier numbers 0 to 239 on symbols 1 & 3, and subcarrier numbers 0 to 47 and 192 to 239 on subcarrier 2.

In 5G, the MIB typically includes the system frame number, the subcarrier spacing for the SIB1, the subcarrier signal block (SSB) subcarrier offset that indicates the frequency domain offset between the SSB and the overall resource block grid in the number of subcarriers.

A SSB-subcarrier Offset field can indicate a frequency domain offset between the SSB and the overall resource block grid in number of subcarriers. This field may indicate that this cell does not provide SIB1 and that there is hence no common CORESET. In this case, the field pdcch-ConfigSIB1 may indicate the frequency positions where the UE may (not) find a SS/PBCH with a control resource set and search space for SIB1.

The MIB can also include Cell Bar information that indicates whether the cell allows a UE associated with a signal received by the TDD repeater, to camp on the cell. An intra-frequency reselection is provided to identify if intra-frequency cell reselection is allowed or not allowed.

The MIB can also include a Control Resource Set (CORESET) that includes a common search space and selected physical downlink control channel (PDCCH) parameters. If the SSB-subcarrier offset field indicates that the SIB 1 is not present, then a field PDCCH-ConfigSIB1 can indicate the frequency positions where the layer-1 modem can find the subcarrier signal/physical broadcast channel block with SIB1.

The SIB1 block is cell-specific information that is only valid for a selected serving cell. The SIB1 is received at the layer-1 modem on a physical downlink shared channel (PDSCH) that can be located based on the information received in the MIB.

The SIB1 block includes a number of fields. The fields include, but are not limited to, cell selection information, cell access related information, Internet Protocol (IP) Multimedia Subsystem (IMS) emergency support information, eCall over IMS support information, timers and constraints for a selected user equipment, cell barring information to identify when a specific UE is barred from communicating with the cell, and Cell ID information to identify a cell within a public land mobile network (PLMN).

Figure 5E:
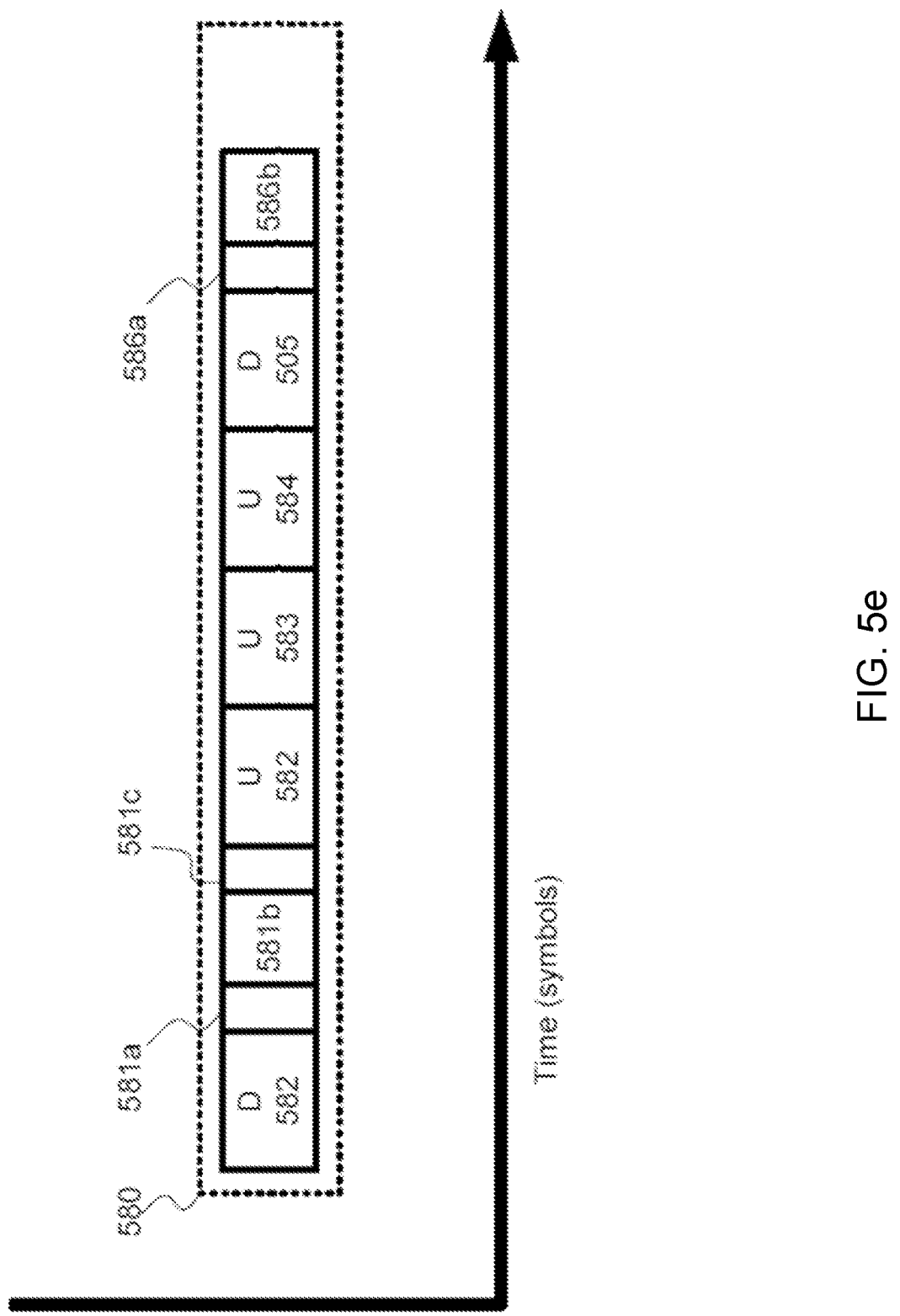
FIG. 5e illustrates an UL/DL TDD frame structure in accordance with an example.

The layer-1 modem can be configured to receive the TDD configuration for a selected signal. The TDD configuration and timing information can be used to determine a timing for the TDD repeater to switch from UL to DL. FIG. 5e illustrates an example TDD configuration 580 for an LTE TDD frame structure 0. The frame structure includes time periods (sub-frames) for: downlink (D) 582, special (S) 581 comprised of 581a (Downlink Pilot Training Symbol (DwPTS)), 581b (Guard Period (GP)), and 581c (Uplink Pilot Training Symbol (DwPTS)), uplink (U) 582, U 583, U 584, D 585, 586a, and 586b In one example, the TDD repeater including the layer-1 modem, can be configured to receive, and communicate to the TDD repeater, a TDD UL/DL configuration or timing information to determine, at the TDD repeater, the timing of one or more of a guard period, a downlink period, an uplink period, a downlink pilot training symbol period, or an uplink pilot training symbol period for a TDD signal received at the TDD repeater.

In one example, the TDD repeater is configured to enable the DL transmission from the TDD repeater during the guard period, the downlink period, the downlink pilot training symbol period, and a user equipment (UE) timing advance period.

The 3GPP LTE standard is configured to transmit and receive TDD signals based on a subframe granularity. A predetermined uplink-downlink configuration can be used to determine which subframes are used for uplink and which are used for downlink. In another example, as illustrated in FIG. 5f, the 3GPP LTE frame structure is configured with a radio frame of length 10 milliseconds (ms) that can include two half-frames of length 5 ms each. Each half-frame can include 5 subframes of length 1 ms. Each subframe can include two slots of length 0.5 ms each. The uplink-downlink configuration in a cell can vary between frames and controls in which subframes uplink or downlink transmission can take place in the current frame. The supported uplink-downlink configurations can be configured as listed in FIG. 5f where, for each subframe in a radio frame, "D" can denote a downlink subframe reserved for downlink transmissions, "U" can denote an uplink subframe reserved for uplink transmissions, and "S" can denote a special subframe. The special subframes are used to communicate control information. Uplink-downlink configurations with both 5 ms and 10 ms downlink-to-uplink switch-point periodicity can be supported. In the case of 5 ms downlink-to-uplink switch-point periodicity, the special subframe can exist in both half-frames (slots). In the case of 10 ms downlink-to-uplink switch-point periodicity, the special subframe can exist in the first half-frame only. In the 3GPP LTE Version 8 standard, there are seven different preconfigured uplink-downlink configurations, numbered between 0 and 6, as illustrated in FIG. 5f.

A 3GPP LTE base station can be configured to transmit which of the seven UL/DL configurations will be used. In another example, a repeater can be configured to receive the UL/DL configuration from the base station. The configuration information is typically transmitted from the base station via higher layer signaling, such as radio resource control (RRC) signaling. In another example, for each radio frame, the repeater can demodulate and/or decode control information in a physical downlink control channel (PDCCH) or physical downlink shared channel (PDSCH) using a downlink control information (DCI) format type to receive UL/DL configuration. In one example, a TDD switch controller can be used to receive the 3GPP LTE UL/DL configuration information from a base station for a cellular signal associated with the base station. Alternatively, a UE can receive and decode the UL/DL configuration information from the base station (i.e. evolved Node B or eNB) and communicate the UL/DL configuration information to the repeater via a wireless transmission using a predetermined wireless standard, as previously discussed.

FIGS. 5g and 5h provide example UL/DL configurations for 3GPP 5G communication, as described in 3GPP Rel.

15.0.0. In 5G communication, a frame of 10 ms duration can include ten subframes of 1 ms duration. Each frame can include two equally-sized half-frames of five subframes. Half-frame 0 can include subframes 0-4 and half-frame 1 can include subframes 5-9. There can be one set of frames in the uplink and one set of frames in the downlink. Orthogonal frequency-division multiplexing (OFDM) symbols in a slot can be classified as 'downlink', 'flexible', or 'uplink'. In a slot in a downlink frame, downlink transmissions can only occur in 'downlink' or 'flexible' symbols. In a slot in an uplink frame, the uplink transmission can only occur in 'uplink' or 'flexible' symbols.

In another example, as illustrated in FIGS. 5g and 5h, a slot format can be identified by a corresponding format index ranging from 0 to 55 where 'D' can denote a downlink symbol, 'U' can denote an uplink symbol, and 'F' can denote a flexible symbol. In another example, the symbol number in a slot can range from 0 to 13. In another example, slot format indices ranging from 56 to 254 can be reserved. In another example, a slot format index 255 can have a slot format as disclosed in 3GPP TS 38.213 V16.3.0 (2020-10).

In another example, a repeater can be configured to receive the slot format per slot over a number of slots as indicated by one or more higher layer parameters via higher layer signaling (such as RRC signaling). The higher layer parameters can provide a reference subcarrier spacing, a slot configuration period, a number of downlink symbols, or a number of uplink symbols. In another example, the repeater can be configured to receive a higher layer parameter that can override only the flexible symbols per slot over a number of slots as provided by another higher layer parameter.

In another example, a repeater can be configured to receive a higher layer parameter that includes a set of slot format combinations, in which each slot format combination can include one or more slot formats as illustrated in FIGS. 5g and 5h. In another example, a repeater can be configured to demodulate and/or decode control information on a physical control channel or physical shared channel that includes a slot format. In one example, a TDD switch controller can be used to receive the 3GPP 5G UL/DL configuration information from a base station for a cellular signal associated with the base station.

In one example, the modem can be configured to provide an accurate path loss calculation between the node and the repeater. In some cases, algorithms can assume that the node is transmitting with a power of 30 decibel-milliwatts (dBm). Because nodes can transmit with different power levels at different times, a small cell may potentially transmit less power. In one example, the repeater can determine whether the associated UE is transmitting to a near tower or a far tower. In the case of a far tower, overload gain reduction requirements can be reduced. In this example, the overload gain reduction requirement can be reduced by: (a) about 8 decibels (dB) to about 10 dB for in-building repeaters, (b) greater than about 20 dB for mobile repeaters, or (c) about completely for cradle-coupled repeaters or direct-connect repeaters.

In one example, a modem-based network protection repeater can include a modem that can serve local carriers and modulation types. The modem may not have a service contract with a service provider because the modem can communicate on pilot channels. For example, the modem can be configured to operate on control channels or reference signals. In some cases, the modem may have a service contract with a service provider.

In one example, base stations can request a UE to transmit at a specific power level based on the received power level and calculated path loss. The repeater can use the requested UL power level from the base station to calculate a path loss from the repeater to the base station. In one example, the repeater can calculate path loss to all of the carriers and towers in an area based on the base stations' requested (or modem's measured) uplink power. The repeater can limit the number of base stations calculated to the nearest towers because the nearest towers can affect the level of network protection more than the farthest towers.

In some examples, the repeater can use the UL requested power, the UL transmitted power, the DL RSSI, or other modem-supplied information to calculate overload and noise power gain reduction levels. These overload and noise power gain reduction levels can be more accurate than the levels that can be estimated based on previous FCC standards used with FDD repeaters. For macro stations, the levels can be less sensitive which can enhance performance. For small cells, the levels can be more sensitive, which can enhance network protection compared to levels provided based on previous FCC standards used with FDD repeaters. In other examples, repeater GPS location combined with a node location can be used to provide network protection. A database can be used to store the location information for each of the nodes. In some cases, a reduction in the overload gain reduction can allow for an increase in UL gain and noise power, which can increase the coverage area provided by the repeater.

In one example, the repeater can be configured to sweep the first frequency band for one or more signals. For example, signal B can be detected from node X and signal C can be detected from node Y. The repeater can be configured to determine a proximity for each of the one or more signals. For example, node X can be about one mile from the repeater and node Y can be about half a mile from the repeater. The repeater can be configured to identify, from the one or more signals, a lowest-proximity signal, wherein the lowest-proximity signal has a lowest proximity from the repeater. For example, node Y is closer to the repeater than node X. The repeater can be configured to calculate the gain or noise power level from the power level indicator for the lowest-proximity signal. For example, the repeater can calculate the gain or noise power level from the power level indicator based on node Y.

In another example, the repeater can be configured to calculate a path loss from the repeater to a node based on the power level indicator. In another example, the repeater can be configured to identify a type of the node and a distance between the repeater and the node based on the path loss from the repeater to the node. The repeater can be configured to adjust a network protection gain level or a noise power level based on the type of node and the distance between the repeater and the node. In one example, the power level indicator can include a UL requested power, an UL transmitted power, or a DL RSSI.

In one example, the repeater can be configured to adjust an overload gain reduction level or a noise power gain reduction level based on a location of the repeater and a location of a base station. In another example, the repeater can be configured to measure a control channel (or reference signal) transmit power from the base station, and estimate a BSCL from the control channel (or reference signal) transmit power. In one example, the repeater can receive a base station requested transmit power from a user equipment (UE), and adjust the UL gain based on the base station requested transmit power.

Figure 6:
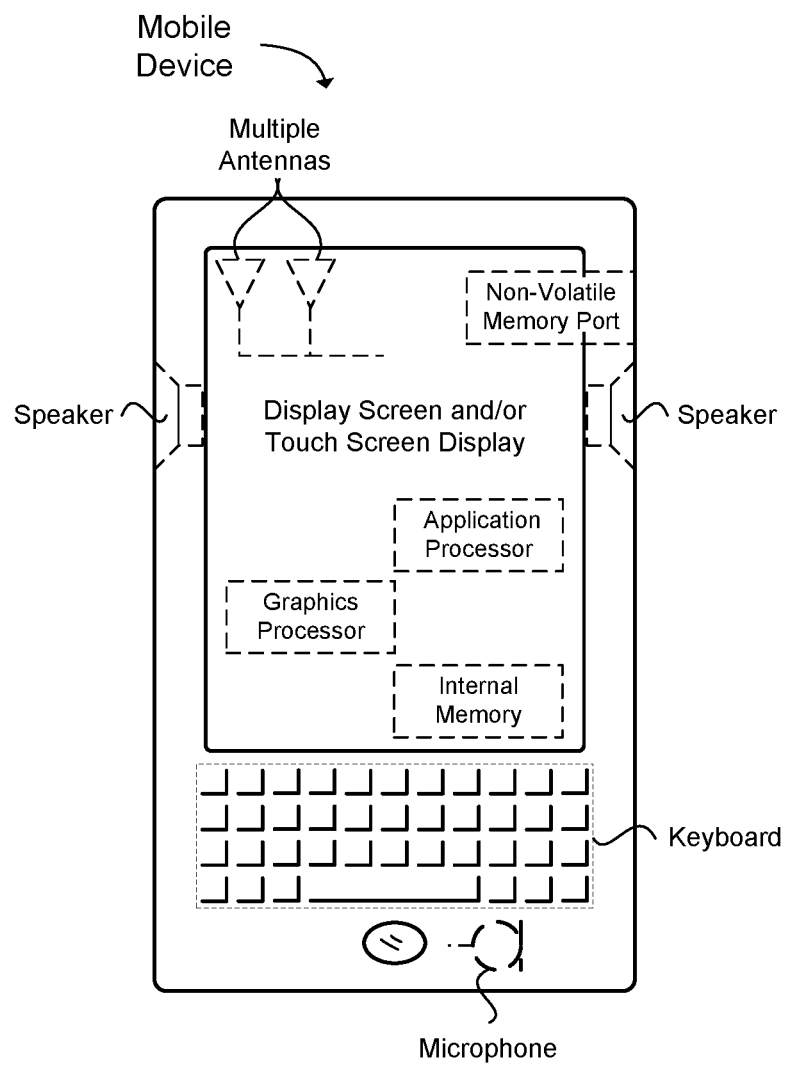
FIG. 6 illustrates a user equipment (UE) in accordance with an example.

FIG. 6 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a new radio node B (gNB) a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, 3GPP 5G, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 7:
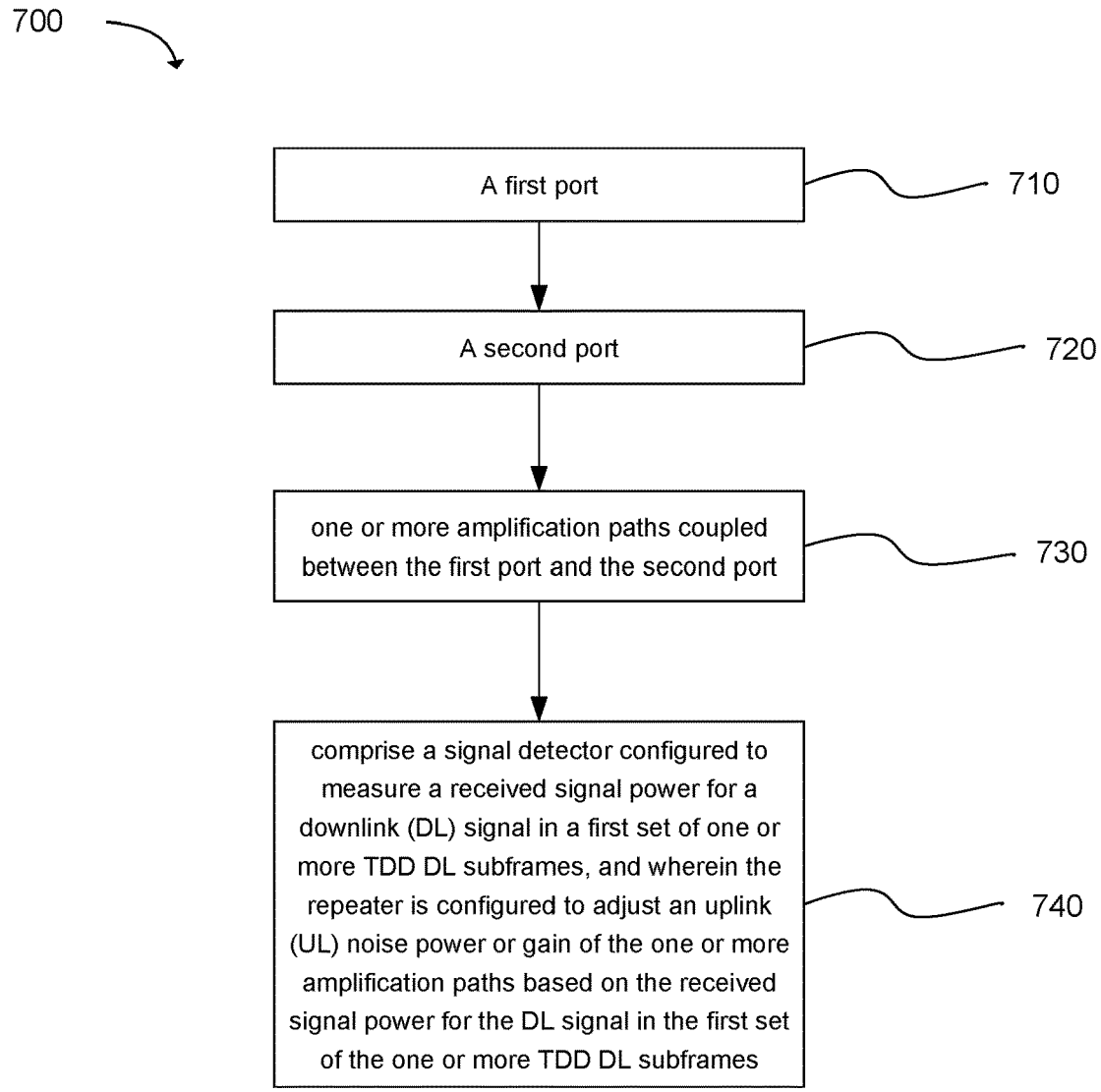
FIG. 7 depicts functionality of a time division duplex (TDD) repeater in accordance with an example.

Another example provides functionality for a time division duplex (TDD) repeater 700, as shown in the flow chart in FIG. 7. The TDD repeater can comprise: a first port, as shown in block 710. The TDD repeater can comprise: a second port, as shown in block 720. The TDD repeater can comprise: one or more amplification paths coupled between the first port and the second port, as shown in block 730. The TDD repeater can comprise a signal detector configured to measure a received signal power for a downlink (DL) signal in a first set of one or more TDD DL subframes, and wherein the repeater is configured to adjust an uplink (UL) noise power or gain of the one or more amplification paths based on the received signal power for the DL signal in the first set of the one or more TDD DL subframes, as shown in block 740.

Figure 8:
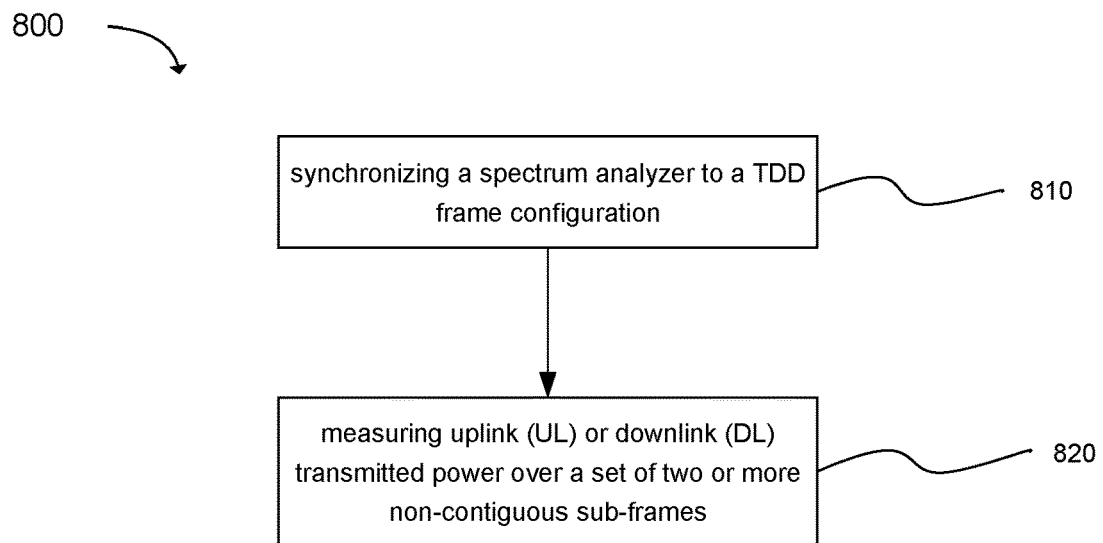
FIG. 8 depicts functionality of a time division duplex (TDD) repeater in accordance with an example.

Another example provides a power measurement method 800 for a time division duplex (TDD) repeater, as shown in the flow chart in FIG. 8. The method can comprise: synchronizing a spectrum analyzer to a TDD frame configuration, as shown in block 810. The method can comprise measuring uplink (UL) or downlink (DL) transmitted power over a set of two or more non-contiguous sub-frames, as shown in block 820. The method can comprise calculating an average noise power measurement from the UL or DL transmitted power over the set of two or more non-contiguous sub-frames, as shown in block 830.

Figure 9:
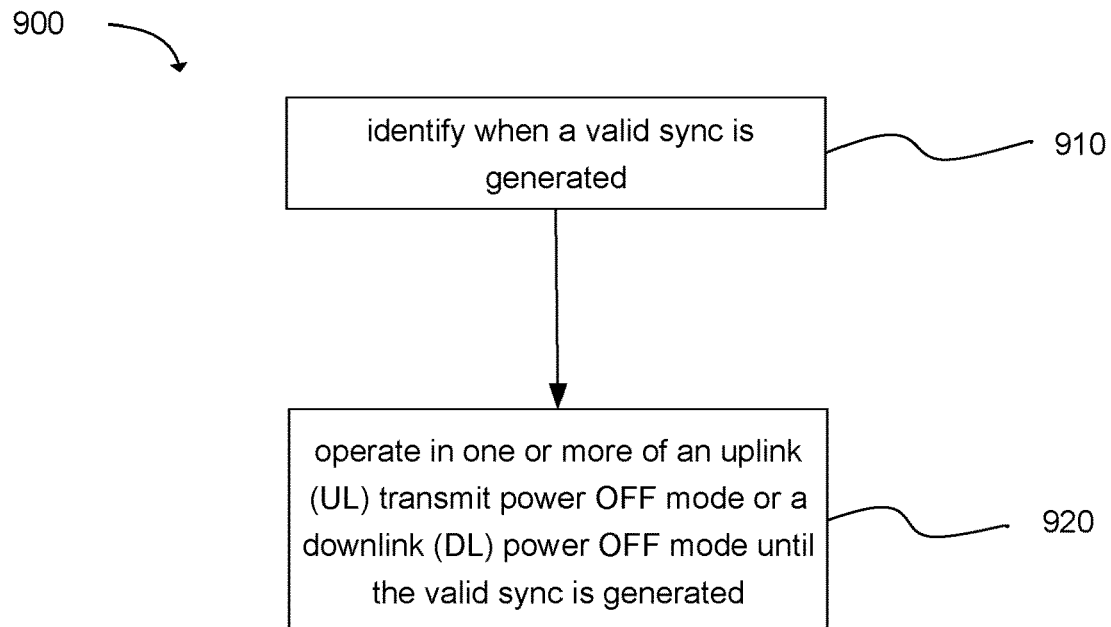
FIG. 9 depicts functionality of a time division duplex (TDD) repeater in accordance with an example.

Another example provides functionality for a time division duplex (TDD) repeater 900, as shown in the flow chart in FIG. 9. The TDD repeater can be configured to: identify when a valid sync is generated, as shown in block 910. The TDD repeater can be configured to operate in one or more of an uplink (UL) transmit power OFF mode or a downlink (DL) power OFF mode until the valid sync is generated, as shown in block 920.

Figure 10:
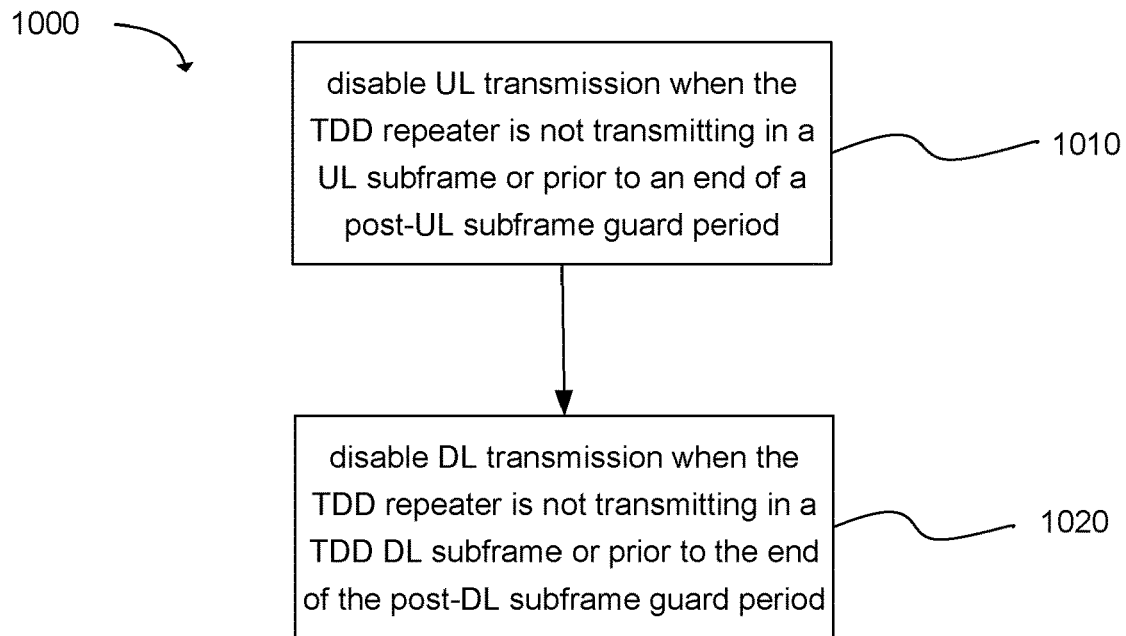
FIG. 10 depicts functionality of a time division duplex (TDD) repeater in accordance with an example.

Another example provides functionality for a time division duplex (TDD) repeater 1000, as shown in the flow chart in FIG. 10. The TDD repeater can be configured to: disable UL transmission when the TDD repeater is not transmitting in a UL subframe or prior to an end of a post-UL subframe guard period, as shown in block 1010. The TDD repeater can be configured to disable DL transmission when the TDD repeater is not transmitting in a TDD DL subframe or prior to the end of the post-DL subframe guard period, as shown in block 1020.

Figure 11:
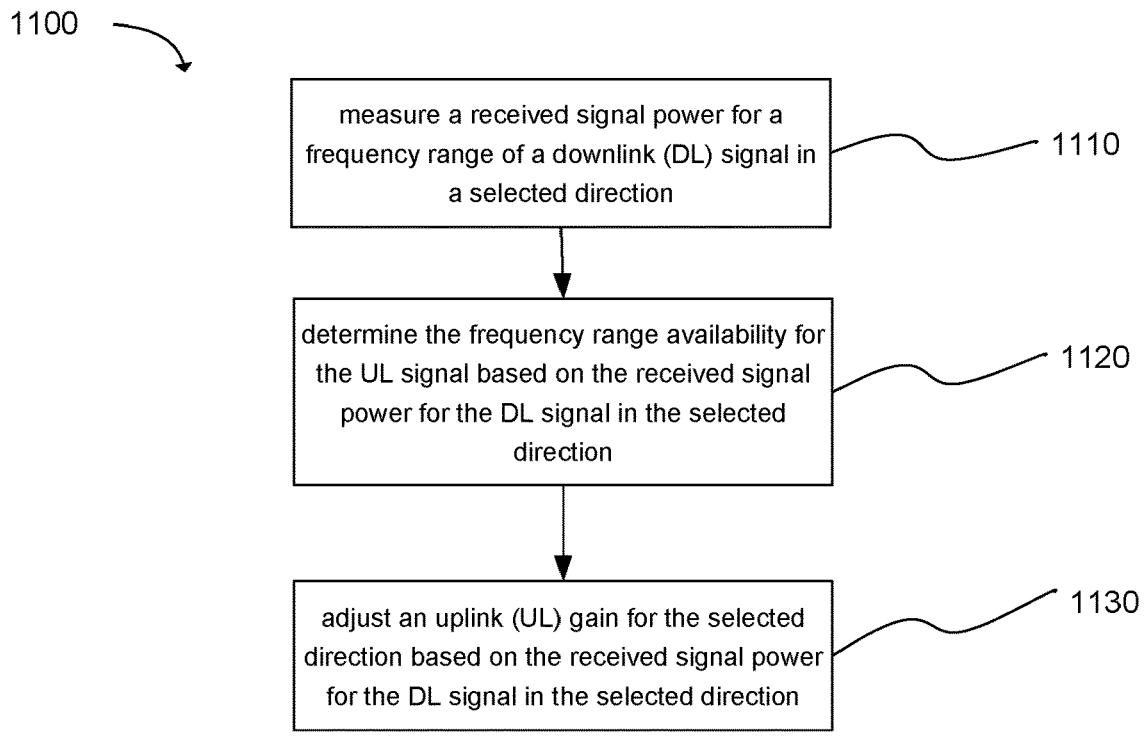
FIG. 11 depicts functionality of a time division duplex (TDD) repeater in accordance with an example.

Another example provides functionality for a time division duplex (TDD) repeater 1100, as shown in the flow chart in FIG. 11. The TDD repeater can be configured to: measure a received signal power for a frequency range of a downlink (DL) signal in a selected direction, as shown in block 1110. The TDD repeater can be configured to determine the frequency range availability for the UL signal based on the received signal power for the DL signal in the selected direction, as shown in block 1120. The TDD repeater can be configured to adjust an uplink (UL) gain for the selected direction based on the received signal power for the DL signal in the selected direction, as shown in block 1130.

Figure 12:
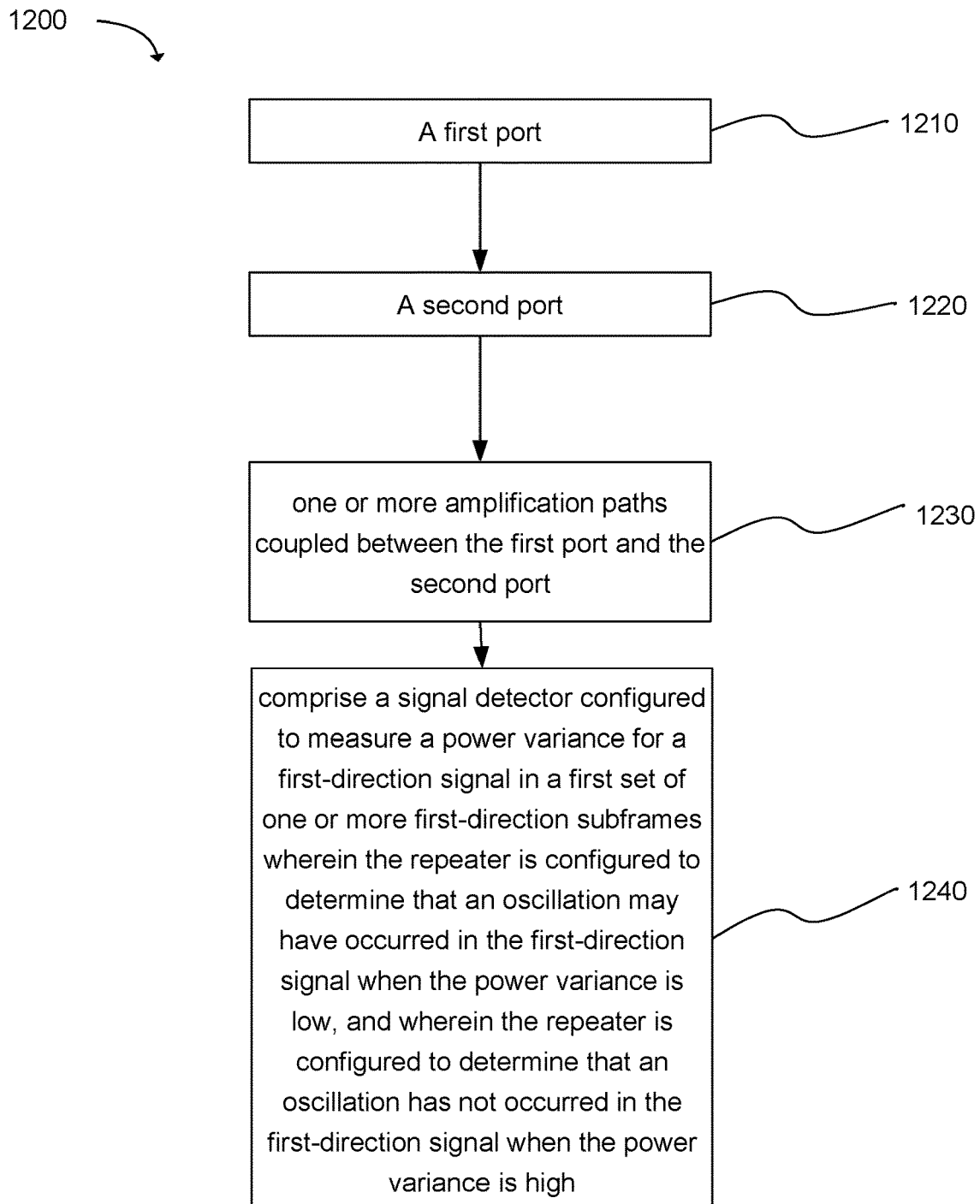
FIG. 12 depicts functionality of a time division duplex (TDD) repeater in accordance with an example.

Another example provides functionality for a time division duplex (TDD) repeater 1200, as shown in the flow chart in FIG. 12. The TDD repeater can comprise: a first port, as shown in block 1210. The TDD repeater can comprise: a second port, as shown in block 1220. The TDD repeater can comprise: one or more amplification paths coupled between the first port and the second port, as shown in block 1230. The TDD repeater can comprise a signal detector configured to measure a power variance for a first-direction signal in a first set of one or more first-direction subframes wherein the repeater is configured to determine that an oscillation may have occurred in the first-direction signal when the power variance is low, and wherein the repeater is configured to determine that an oscillation has not occurred in the first-direction signal when the power variance is high, as shown in block 1240.

Figure 13:
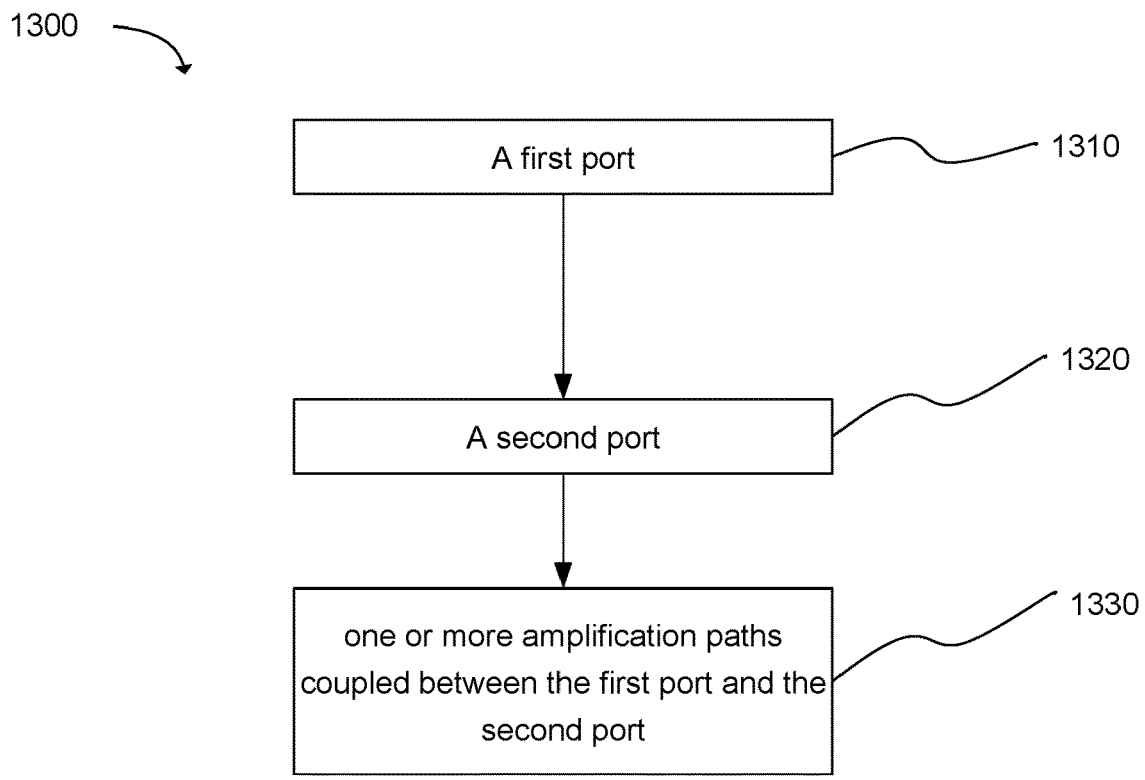
FIG. 13 depicts functionality of a cellular repeater in accordance with an example.

Another example provides functionality for a cellular repeater 1300, as shown in the flow chart in FIG. 13. The cellular repeater can comprise: a first port, as shown in block 1310. The cellular repeater can comprise: a second port, as shown in block 1320. The cellular repeater can comprise: one or more amplification paths coupled between the first port and the second port, as shown in block 1330. The cellular repeater can be configured to determine a presence of in-band non-cellular signals in a selected first-direction frequency band, and initiate a network protection action when the in-band non-cellular signals are present.

Figure 14:
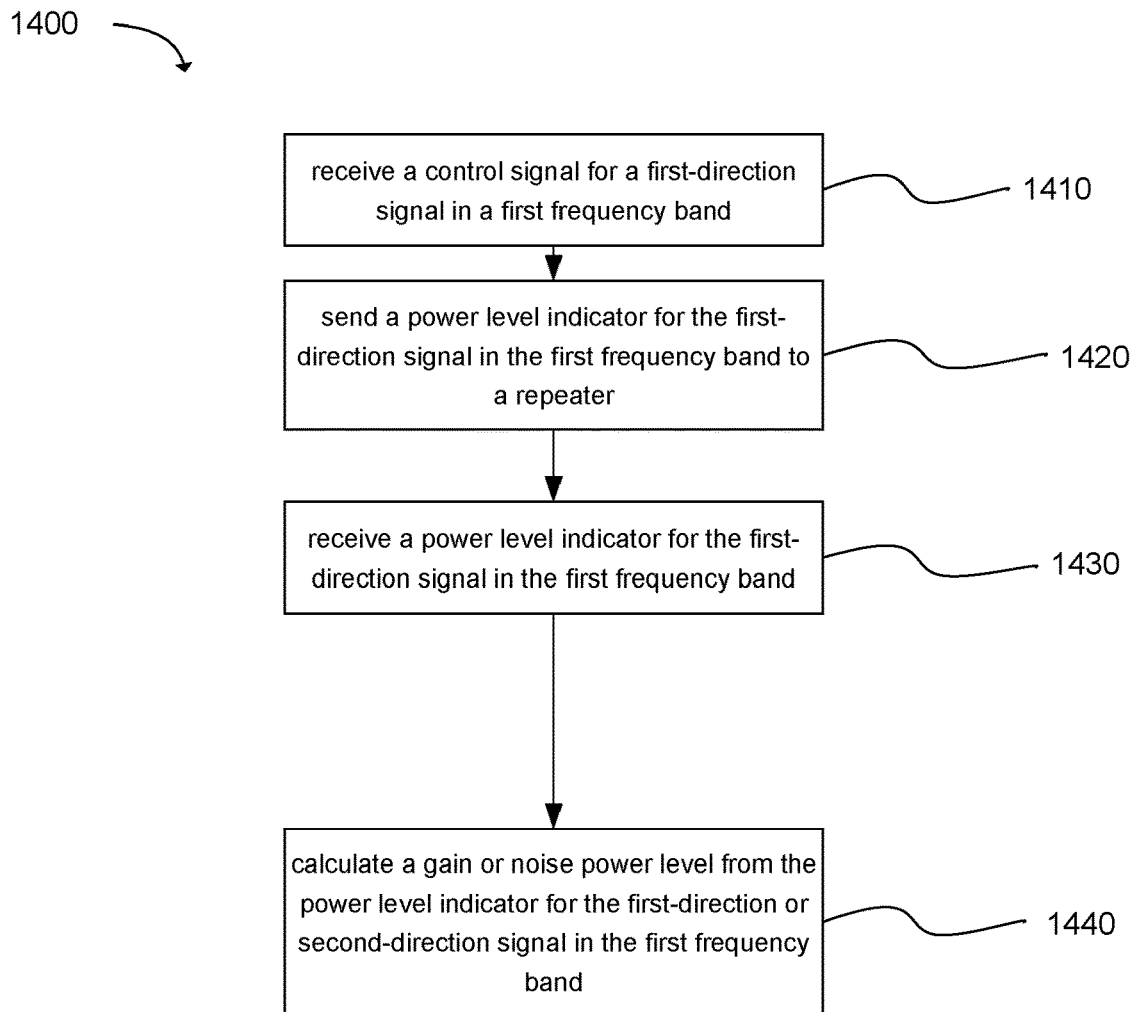
FIG. 14 depicts functionality of a repeater in accordance with an example.

Another example provides functionality for a repeater 1400 operable for network protection, as shown in the flow chart in FIG. 14. The repeater can be configured to: receive a control signal for a first-direction signal in a first frequency band, as shown in block 1410. The repeater can be configured to send a power level indicator for the first-direction signal in the first frequency band to a repeater, as shown in block 1420. The repeater can be configured to receive a power level indicator for the first-direction signal in the first frequency band, as shown in block 1430. The repeater can be configured to calculate a gain or noise power level from the power level indicator for the first-direction or second-direction signal in the first frequency band, as shown in block 1440.

Figure 15:
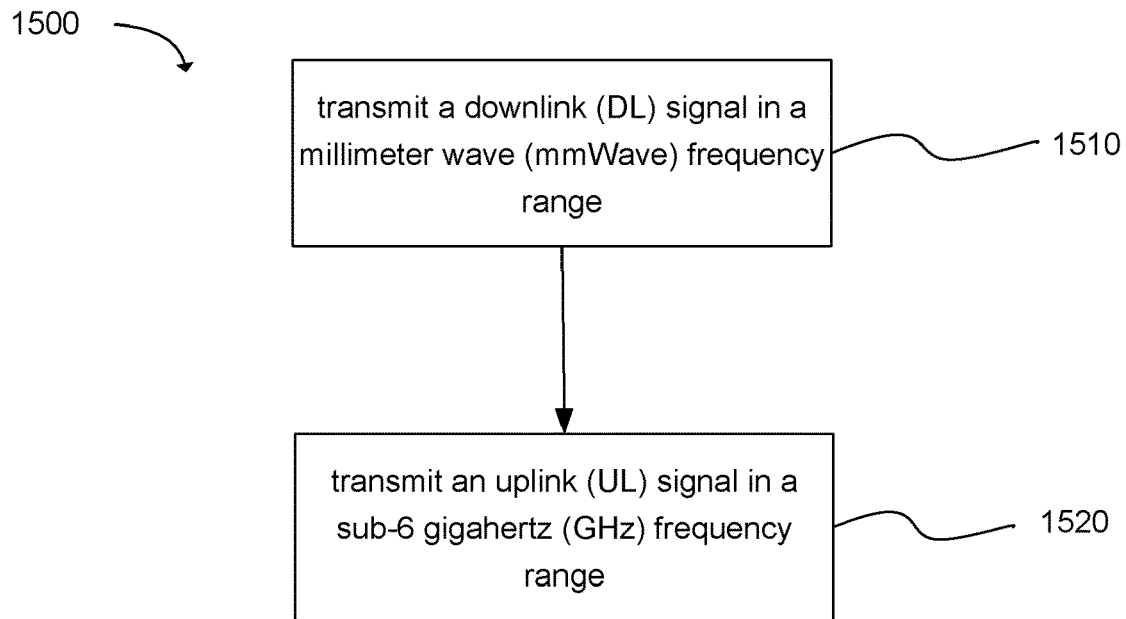
FIG. 15 depicts functionality of a time division duplex (TDD) repeater in accordance with an example.

Another example provides functionality for a time division duplex (TDD) repeater 1500, as shown in the flow chart in FIG. 15. The TDD repeater can be configured to transmit a downlink (DL) signal in a millimeter wave (mm Wave) frequency range (i.e. a frequency range between 6 GHz and 300 GHz), as shown in block 1510. The TDD repeater can be configured to transmit an uplink (UL) signal in a sub-6 gigahertz (GHz) frequency range, as shown in block 1520.

Figure 16:
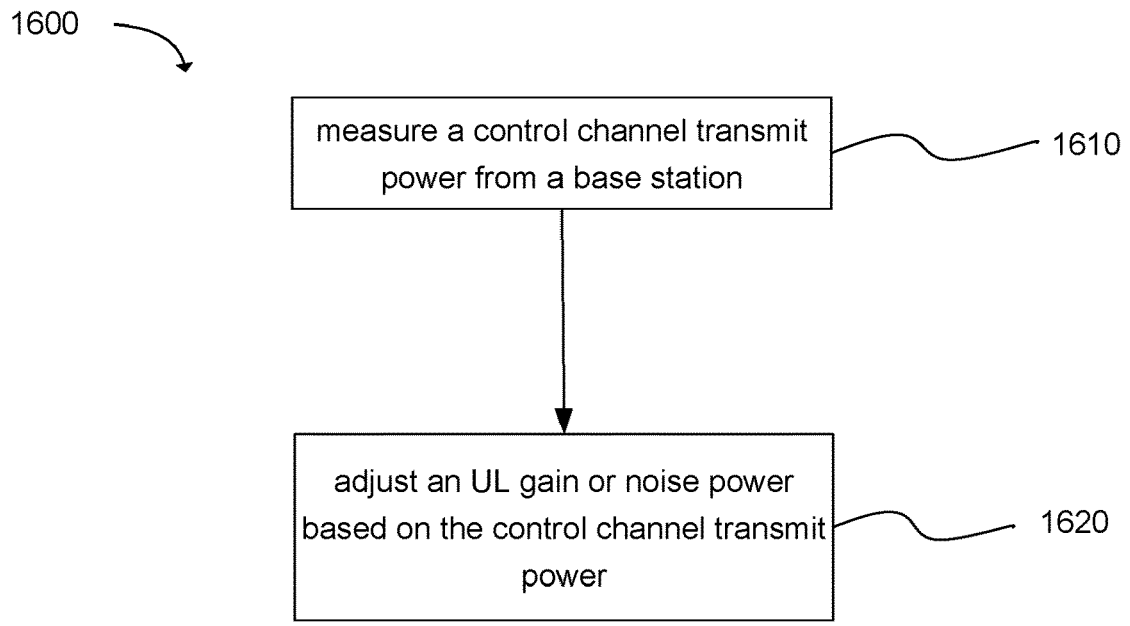
FIG. 16 depicts functionality of a time division duplex (TDD) repeater in accordance with an example.

Another example provides functionality for a time division duplex (TDD) repeater 1600, as shown in the flow chart in FIG. 16. The TDD repeater can be configured to measure a control channel transmit power from a base station, as shown in block 1610. The TDD repeater can be configured to adjust an UL gain or noise power based on the control channel transmit power, as shown in block 1620.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater configured to:
   transmit a downlink (DL) signal in a millimeter wave (mm Wave) frequency range;
   transmit an uplink (UL) signal in a sub-6 gigahertz (GHz) frequency range; and
   continue a DL transmit power ON mode for one or more downlink amplification paths of the DL signal in the mm Wave frequency range when one or more UL amplification paths are in a transmit power ON mode.

2. The repeater of claim 1, wherein the repeater is further configured to:
   identify when a valid UL or a sub-6 GHz sync is generated; and
   operate in an uplink (UL) transmit power OFF mode until the valid sync is generated.

3. The repeater of claim 1, wherein:
   the DL signal and the UL signal are in a different frequency range; or
   the DL signal is physically isolated from the UL signal.

4. The repeater of claim 1, wherein the repeater is further configured to:
   transmit the DL signal using time division duplex (TDD) in a TDD band; and
   transmit the UL signal using frequency division duplex (FDD) in an FDD band.

5. The repeater of claim 4, wherein the repeater is further configured to:
   transmit UL control channel information on the FDD band; and
   transmit UL data on a TDD band.

6. The repeater of claim 1, wherein the DL signal in the mm Wave frequency range is in a frequency range 2 (FR2) band and the UL signal is in a frequency range 1 (FR1) band.

7. The repeater of claim 1, wherein the UL signal is used to transmit control channel information.

* * * * *